(12) United States Patent
Merz et al.

(10) Patent No.: US 11,727,407 B2
(45) Date of Patent: *Aug. 15, 2023

(54) SYSTEMS AND METHODS FOR DETECTING OUT-OF-PATTERN TRANSACTIONS

(71) Applicant: Mastercard International Incorporated, Purchase, NY (US)

(72) Inventors: Christopher John Merz, Wildwood, MO (US); Joshua A. Allbright, Valley Park, MO (US); Peng Yang, Chesterfield, MO (US)

(73) Assignee: Mastercard International Incorporated, Purchase, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/151,523

(22) Filed: Jan. 18, 2021

(65) Prior Publication Data

US 2021/0142330 A1    May 13, 2021

Related U.S. Application Data

(63) Continuation of application No. 15/794,768, filed on Oct. 26, 2017, now Pat. No. 10,896,424.

(51) Int. Cl.
*G06Q 40/00* (2023.01)
*G06Q 20/40* (2012.01)
*G06Q 20/10* (2012.01)

(52) U.S. Cl.
CPC ......... *G06Q 20/4016* (2013.01); *G06Q 20/10* (2013.01)

(58) Field of Classification Search
CPC .......................... G06Q 20/4016; G06Q 20/10
See application file for complete search history.

(56) References Cited

U.S. PATENT DOCUMENTS

| 5,819,226 A | 10/1998 | Gopinathan |
| 7,814,008 B2 | 10/2010 | Choudhuri et al. |

(Continued)

FOREIGN PATENT DOCUMENTS

| EP | 2420966 A1 | 2/2012 |
| WO | 2001077959 A1 | 10/2001 |

(Continued)

OTHER PUBLICATIONS

Kang et al., "Pegasus: A Peta-Scale Graph Mining System—Implementation and Observations," 9th IEEE International Conference on Data Mining, 2009 (Year: 2009).*

(Continued)

*Primary Examiner* — Abhishek Vyas
*Assistant Examiner* — William B. Bunker
(74) *Attorney, Agent, or Firm* — Armstrong Teasdale LLP

(57) ABSTRACT

An inverse recommender system for detecting out-of-pattern payment transactions includes a memory device and a processor programmed to receive transaction data. The transaction data corresponds to historical payment transactions between account holders and merchants. The processor is programmed to generate a merchant correspondence matrix including the merchants and counters indicating the number of historical payment transactions between merchant pairs of the merchants and the account holders. The processor is programmed to store the merchant correspondence matrix in a memory device linking the merchant pairs to each account holder. The processor receives additional transaction data associated with a new payment transaction between an account holder and a merchant, and to generate an inverse recommender score for the new payment transaction based on the account holder's historical payment transaction data. The account holder's historical payment (Continued)

transaction data includes historical payment transaction data associated with the merchants visited by the account holder.

20 Claims, 12 Drawing Sheets

(56) References Cited

U.S. PATENT DOCUMENTS

| | | | |
|---|---|---|---|
| 8,489,476 B1 | 7/2013 | Lester et al. | |
| 8,620,801 B2 | 12/2013 | Choudhuri et al. | |
| 8,694,429 B1 | 4/2014 | Ballaro et al. | |
| 9,331,994 B2 | 5/2016 | Grigg et al. | |
| 9,412,108 B2 | 8/2016 | Wang et al. | |
| 9,477,960 B2 | 10/2016 | Grigg et al. | |
| 9,483,766 B2 | 11/2016 | Grigg et al. | |
| 10,586,235 B2 | 3/2020 | Wang et al. | |
| 2003/0217094 A1 | 11/2003 | Andrews et al. | |
| 2004/0162773 A1 | 8/2004 | Del Rey et al. | |
| 2005/0055373 A1* | 3/2005 | Forman | G06F 21/55 |
| 2007/0094067 A1 | 4/2007 | Kumar et al. | |
| 2007/0185782 A1 | 8/2007 | Shooks et al. | |
| 2008/0140576 A1* | 6/2008 | Lewis | G06Q 30/02 |
| | | | 707/999.107 |
| 2008/0222038 A1* | 9/2008 | Eden | G06Q 20/4016 |
| | | | 705/44 |
| 2009/0132347 A1* | 5/2009 | Anderson | G06Q 30/02 |
| | | | 705/30 |
| 2009/0276269 A1 | 11/2009 | Yee et al. | |
| 2009/0307049 A1 | 12/2009 | Elliot, Jr. et al. | |
| 2010/0228580 A1 | 9/2010 | Zoldi et al. | |
| 2010/0280882 A1* | 11/2010 | Faith | G06Q 40/12 |
| | | | 705/7.37 |
| 2010/0332408 A1* | 12/2010 | Ekhaus | G06Q 30/0631 |
| | | | 705/347 |
| 2012/0296824 A1 | 11/2012 | Rosano | |
| 2013/0036036 A1 | 2/2013 | Zoldi | |
| 2013/0159077 A1 | 6/2013 | Stringfellow et al. | |
| 2014/0032409 A1 | 1/2014 | Rosano | |
| 2014/0258099 A1 | 9/2014 | Rosano | |
| 2014/0279185 A1* | 9/2014 | Merz | G06Q 30/0282 |
| | | | 705/26.7 |
| 2014/0337215 A1 | 11/2014 | Howe | |
| 2015/0012430 A1 | 1/2015 | Chisholm et al. | |
| 2015/0220999 A1 | 8/2015 | Thornton et al. | |
| 2015/0339673 A1 | 11/2015 | Adjaoute | |
| 2016/0125317 A1 | 5/2016 | Benjamin | |
| 2016/0125405 A1 | 5/2016 | Alterman et al. | |
| 2016/0162759 A1 | 6/2016 | Yun et al. | |
| 2016/0171498 A1 | 6/2016 | Wang et al. | |
| 2016/0259826 A1* | 9/2016 | Acar | G06F 16/9535 |
| 2016/0352766 A1 | 12/2016 | Flacher et al. | |
| 2017/0116585 A1 | 4/2017 | Rosano | |
| 2017/0140262 A1* | 5/2017 | Wilson | H04L 67/125 |
| 2017/0169500 A1 | 6/2017 | Merz et al. | |
| 2018/0047036 A1* | 2/2018 | Zhang | G06Q 30/0631 |
| 2018/0053188 A1 | 2/2018 | Zoldi et al. | |
| 2018/0218369 A1 | 8/2018 | Xiao et al. | |
| 2018/0276688 A1* | 9/2018 | Duenner | G06N 5/022 |
| 2019/0073647 A1 | 3/2019 | Zoldi et al. | |
| 2019/0197051 A1* | 6/2019 | Hsu | G06F 16/48 |
| 2019/0220864 A1 | 7/2019 | Avegliano et al. | |
| 2019/0279309 A1 | 9/2019 | Gupta et al. | |
| 2022/0284437 A1* | 9/2022 | Poole | G06Q 20/3278 |

FOREIGN PATENT DOCUMENTS

| | | | | |
|---|---|---|---|---|
| WO | WO-0237219 A2 * | 5/2002 | | G06Q 10/0635 |
| WO | WO-2007004224 A1 * | 1/2007 | | G06Q 20/04 |
| WO | 2011025689 A1 | 3/2011 | | |
| WO | WO-2012013996 A1 * | 2/2012 | | G06F 17/30864 |
| WO | 2012135115 A2 | 10/2012 | | |
| WO | 2014070293 A1 | 5/2014 | | |

OTHER PUBLICATIONS

Rajeshwari et al., "Real-time credit card fraud detection using Streaming Analytics," 978-1-5090-2399-8/16 IEEE, 2016 (Year: 2016).*

Baboo et al. "Analysis of Spending Pattern on Credit Card Detection," IOSR Journal of Computer Engineering, Mar.-Apr. 2017 (Year: 2017).

PCT International Search Report and Written Opinion, Application No. PCT/US2018/031980, dated Nov. 29, 2018, 10 pps.

PCT International Search Report and Written Opinion, Application No. PCT/US2018/052143, dated Jul. 16, 2018, 9 pps.

Wikipedia, "Collaborative Filtering," https://web.archive.org (Year: 2017).

Office Action and Search Report issued in Chinese Patent Application No. 201880069806.2, dated Mar. 29, 2023, with English translation, 15 pages.

* cited by examiner

SYSTEMS AND METHODS FOR DETECTING OUT-OF-PATTERN TRANSACTIONS

CROSS REFERENCE TO RELATED APPLICATIONS

This application is a continuation application of U.S. patent application Ser. No. 15/794,768, filed Oct. 26, 2017, entitled "SYSTEMS AND METHODS FOR DETECTING OUT-OF-PATTERN TRANSACTIONS", the disclosure of which is incorporated herein by reference in its entirety.

BACKGROUND OF THE DISCLOSURE

The field of the disclosure relates generally to systems and methods for detecting out-of-pattern payment transactions and, more particularly, to systems and methods for determining when a specific payment card transaction is not a likely transaction that would be initiated by a specific cardholder based in part on the cardholder's transaction history and merchant network relationship data.

The potential for fraudulent transactions using payment cards or accounts is a major concern for financial institutions as well as the account holders and merchants of the goods and/or services purchased by the account holders. Many online merchants store payment card account information, including payment card numbers, for their returning customers, to process returns, and for purchase trend research. This payment card information may include other cardholder identifying information. In many cases, this information may be stored for processing recurring transactions or to improve the speed of the checkout process for future online transactions. However, this payment card information has the potential to be stolen. The stolen payment card information may then be used to perform fraudulent transactions.

Additionally, card present transactions can lead to compromised payment cards at merchant locations and ATMs. The compromised payment cards can then be used for future fraudulent transactions at other locations. For example, an employee steals credit card information and uses that stolen credit card information to perform fraudulent transactions. Additionally, while the compromise may only occur at Merchant A, the subsequent fraudulent transactions may be transacted with multiple different merchants. The reporting of such fraudulent transactions can be slow, in some cases taking several months to be reported. In addition, some fraud "scoring" or authentication processes used by parties to the transaction may not identify potential test and probe transactions that may occur before a large fraudulent transaction is performed.

In order to detect and prevent fraudulent transactions, two common approaches to fraud detection are often used. These include identifying known patterns of fraudsters and identifying out-of-pattern behavior of account holders. Most approaches for determining out-of-pattern behavior of account holders begins with some aggregated spending pattern data at the industry or merchant level. However, at least some parties may have limited access to certain spending pattern data and merchant network data when performing fraud scoring processes, which can lead to inconsistent fraud detection outcomes and may not identify when a transaction is inconsistent with the prior genuine activity of the card holder.

BRIEF DESCRIPTION OF THE DISCLOSURE

In one embodiment, an inverse recommender system for detecting out-of-pattern payment transactions is provided. The inverse recommender system includes a memory device for storing data and a processor communicatively coupled to the memory device. The processor is programmed to receive first transaction data corresponding to historical payment transactions between a plurality of account holders and a plurality of merchants. The processor is also programmed to generate a merchant correspondence matrix comprising the plurality of merchants and a plurality of counters indicating a number of historical payment transactions between pairs of the plurality of merchants and the plurality of account holders based on the first transaction data. Moreover, the processor is programmed to store the merchant correspondence matrix in the memory device linking the merchant pairs to each account holder of the plurality of account holders. The processor is further programmed to receive second transaction data associated with a new payment transaction between an account holder of the plurality of account holders and a merchant of the plurality of merchants. In addition, the processor is programmed to generate an inverse recommender score for the new payment transaction based on account holder historical payment transaction data from the first transaction data. The account holder historical payment transaction data includes historical payment transaction data associated with the plurality of merchants visited by the account holder.

In another embodiment, a computer-based method for detecting out-of-pattern payment transactions is provided. The method includes receiving first transaction data corresponding to historical payment transactions between a plurality of account holders and a plurality of merchants. The method also includes generating a merchant correspondence matrix comprising the plurality of merchants and a plurality of counters. The counters indicate a number of historical payment transactions between pairs of the plurality of merchants and the plurality of account holders based on the first transaction data. In addition, the method includes storing the merchant correspondence matrix in a memory device linking the merchant pairs to each account holder of the plurality of account holders. Furthermore, the method includes receiving second transaction data associated with a new payment transaction between an account holder of the plurality of account holders and a merchant of the plurality of merchants. Moreover, the method includes generating an inverse recommender score for the new payment transaction based on account holder historical payment transaction data from the first transaction data. The account holder historical payment transaction data includes historical payment transaction data associated with the plurality of merchants visited by the account holder.

In yet another embodiment, one or more non-transitory computer-readable storage media having computer-executable instructions embodied thereon is provided. When executed by at least one processor, the computer-executable instructions cause the processor to receive first transaction data corresponding to historical payment transactions between a plurality of account holders and a plurality of merchants. In addition, the executable instructions cause the processor to generate a merchant correspondence matrix comprising the plurality of merchants and a plurality of counters indicating a number of historical payment transactions between pairs of the plurality of merchants and the plurality of account holders based on the first transaction data. Furthermore, the executable instructions cause the processor to store the merchant correspondence matrix in a memory device linking the merchant pairs to each account holder of the plurality of account holders. Moreover, the executable instructions cause the processor to receive second transaction data associated with a new payment transaction between an account holder of the plurality of account holders and a merchant of the plurality of merchants. In addition, the executable instructions cause the processor to generate an inverse recommender score for the new payment transaction based on account holder historical payment transaction data from the first transaction data. The account holder historical payment transaction data comprising historical payment transaction data associated with the plurality of merchants visited by the account holder.

BRIEF DESCRIPTION OF THE DRAWINGS

FIG. 1 is a schematic diagram illustrating an example multi-party payment card network system having an inverse recommender module.

FIG. 2 is a simplified block diagram of an example payment card network system including a plurality of computer devices and the inverse recommender module shown in FIG. 1.

FIG. 3 is an expanded block diagram of an example embodiment of an architecture of a server system of the payment card network system shown in FIG. 2.

FIG. 4 shows a configuration of a database within a database server of the server system shown in FIG. 3, with other related server components.

FIG. 5 illustrates an example configuration of a user system operated by a user, such as the cardholder shown in FIG. 1.

FIG. 6 illustrates an example configuration of a server system, such as the server system shown in FIGS. 2-4.

FIG. 7 is a block diagram showing operation of the inverse recommender module shown in FIG. 1.

FIG. 8 is a block diagram showing the process of generating a sparse merchant correspondence matrix for use with the inverse recommender module shown in FIG. 1.

FIG. 9 is an illustration of the steps performed in the inverse recommender module shown in FIG. 1.

FIG. 10 is a plot of fraud score and a combination fraud score for use with the payment card network system shown in FIG. 1.

FIG. 11 is a plot of a cardholder's inverse recommender score for a series of transactions, as generated by the inverse recommender module shown in FIG. 1.

FIG. 12 is flow chart of an example method for detecting out-of-pattern payment card transactions using a computer device coupled to a memory device, such as the inverse recommender module shown in FIG. 1.

Like numbers in the Figures indicate the same or functionally similar components.

DETAILED DESCRIPTION OF THE DISCLOSURE

Figure 1:
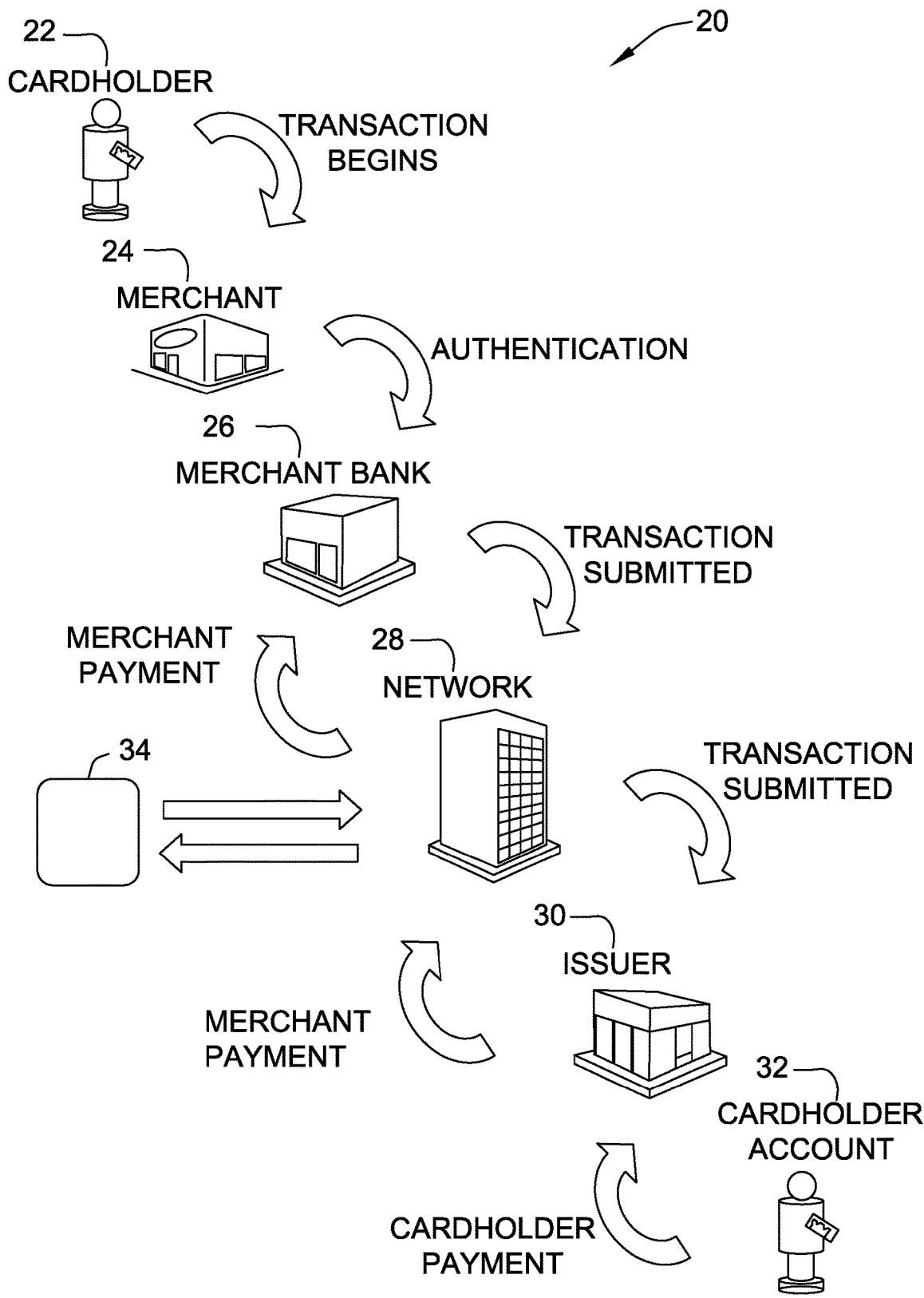
FIGS. 1-12 show exemplary embodiments of the methods and systems described herein.

The following detailed description illustrates embodiments of the disclosed systems and methods by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, methods and systems for detecting out-of-pattern payment card transactions that may be an indication of fraud. More specifically, a specially programmed computer module referred to as an inverse recommender module is configured to collect transaction data associated with a plurality of payment cardholders and merchants, and selectively use one or more specialized algorithms applied to the transaction data to detect out-of-pattern transactions.

In one example embodiment, the inverse recommender module is configured for use with a payment card processing network such as, for example, an interchange network. The inverse recommender module includes a memory device and a processor in communication with the memory device and is programmed to communicate with the payment network to receive transaction information for a plurality of account holders. The payment network is configured to process payment card transactions between the merchant and its acquirer bank, and the cardholder and their issuer bank. Transaction information includes data relating to purchases made by account holders at various merchants during a predetermined time period.

The inverse recommender module uses a correspondence matrix of financial transactions made at a plurality of merchants by a plurality of account holders to generate links between the merchants. This correspondence matrix is stored within a database. The inverse recommender module generates the correspondence matrix from a null matrix based on the assumption that if one account holder purchases goods and/or services at a first merchant and then a second merchant, the two merchants are related by a preference of the account holder. For example, for account holders that transact at two or more merchants of the plurality of merchants during a predetermined time period, the inverse recommender module populates the null matrix to create the correspondence matrix of merchant associations for the plurality of merchants indicating the number of transactions between each merchant combination and the cardholders. For each account holder that has transacted at multiple merchants within the specified segment, the inverse recommender module updates the correspondence matrix stored within the database with the transaction information. More specifically, a counter is associated with each merchant within the correspondence matrix and is stored in the database. For each pair of merchants visited by each account holder, the inverse recommender module increments the counter associated with those merchants. Accordingly, the more often an account holder of the plurality of cardholders transacts with a merchant, the more associations that merchant will obtain within the matrix. Thus, the inverse recommender module is configured to associate merchants based on how account holders link them together via transactions using a payment card or similar device. The inverse recommender module carries this assumption to hundreds of thousands or millions of transactions and relates the merchants in the transactions to each other using the correspondence matrix. The correspondence matrix is a symmetric matrix.

The information captured in the correspondence matrix can be used to generate inverse recommender scores for merchants, where the inverse recommender score is an indicator of a likelihood of a fraudulent transaction. The inverse recommender module provides relevant inverse recommender scores without knowledge of an account holder's preferences for the merchants by inferring preferences based on merchants frequented by the account holder. The merchant data is retrieved from financial transaction data made accessible to the inverse recommender module. The inverse recommender module derives the importance of a merchant based on how they are connected in the correspondence matrix, e.g., by the number of account holder co-visits between the merchants. Thus, when an account holder makes a purchase at a new merchant (e.g., a merchant where the account holder has not previously transacted business), the inverse recommender module generates an inverse recommender score for that transaction. This score can be thought of as a score that reflects a likelihood that this merchant is one where the account holder would not likely perform a transaction with.

In one embodiment, the inverse recommender module determines that the account holder has not transacted with this merchant before. The inverse recommender module then determines what merchants the account holder has transacted with in the past and generates a historic transaction vector associated with the account holder. The historic transaction vector represents a measurement of the account holder's historic transactions with the merchants of the correspondence matrix. In some embodiments, the inverse recommender module normalizes the historic transaction vector such that each merchant is given a value, and the values for the plurality of merchants sum to one. In the example embodiment, the inverse recommender module multiplies the correspondence matrix by the historic transaction vector to determine an inverse recommender score vector. The inverse recommender score vector is associated with the account holder historic transaction information and includes an inverse recommender score for each merchant of the plurality of merchants. The inverse recommender score represents a measure of the likelihood that a transaction with that merchant is fraudulent. In some embodiments, the inverse recommender score vector may be combined with the historic transaction vector using a weighting technique. The inverse recommender module may then multiply the correspondence matrix by the weighted combination vector to determine the inverse recommender score vector. This process may be repeated a predetermined number of iterations.

To determine whether the particular transaction with the new merchant is out-of-pattern transaction behavior for the account holder, the proportionate change in the values for each merchant between the initial user historic transaction vector and the inverse recommender score vector is compared. If the account holder's transaction history causes the value for the new merchant to increase significantly, then that means the cardholder's transaction history is nearby that merchant. If the account holder's transaction history causes the merchant's value to decrease, or increase only slightly relative to the other merchants' values, that is an indication that the particular transaction is out-of-pattern for the cardholder. If the percentage change in the value is negative or proportionately small compared to other merchants, the new transaction is determined to be out-of-pattern for the account holder and is an indication of a likelihood of a fraudulent transaction.

A technical effect of the systems and methods described herein is achieved by performing at least one of the following steps: (a) receiving, by the inverse recommender module, first financial transaction data corresponding to historical payment card transactions between a plurality of account holders and a plurality of merchants; (b) generating a merchant correspondence matrix including the plurality of merchants and a plurality of counters indicating a number of historical payment card transactions between pairs of the plurality of merchants and the plurality of account holders based on the first financial transaction data; (c) storing the merchant correspondence matrix, including the plurality of counters, in a database; (d) receiving, by the inverse recommender module, second financial transaction data associated with a new payment card transaction between an account holder of the plurality of account holders and a merchant of the plurality of merchants; and (e) generating an inverse recommender score for the new payment card transaction based on account holder historical payment card transaction data from the first financial transaction data, where the account holder historical payment card transaction data includes historical payment card transaction data associated with the plurality of merchants visited by the account holder.

As used herein, the terms "transaction card," "financial transaction card," and "payment card" may include any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction.

The term "processor," as used herein, includes any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution mobile devices, clusters, personal computers, workstations, clients, servers, and a processor wherein the memory includes RAM memory, ROM memory, EPROM memory, EEPROM memory, and non-volatile RAM (NVRAM) memory. The above memory types are exemplary only, and are thus not limiting as to the types of memory usable for storage of a computer program.

Furthermore, as used herein, the term "real-time" includes at least one of the times of occurrence of the associated events, the time of collection of data, the time to process the data, and the time of a system response to the events and the environment. In the embodiments described herein as occurring in real-time, these activities and events occur substantially instantaneously.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosed systems and methods have general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card network system 20 having an inverse recommender module 34. In the example embodiment, payment card network system 20 enables payment-by-card transactions in which merchants 24 and card issuers 30 do not need to have a one-to-one relationship. Inverse recommender module 34 is a specially programmed computer system that enables merchant data from multi-party payment card network system 20 to be used for determining a cardholder's or a user's out-of-pattern transaction behavior when a transaction card associated with the cardholder is used to tender payment for a purchase from merchant 24. In some cases, the cardholder is an account holder that initiates transactions processed by payment card network system 20. In other cases, anyone with access to the cardholder's payment card, for example, through a website or smartphone app can be a cardholder. Inverse recommender module 34 is specially programmed with a plurality of algorithms that are configured to receive various amounts of cardholder data from the cardholder in the form of historical transaction data, merchant data, and inferred data from other sources of information and/or communications. The combined data is then used to determine an inverse recommender score for a merchant associated with a particular transaction. The inverse recommender score can be thought of as a score to determine whether a particular merchant would ever be recommended to a cardholder. If the inverse recommender score is low or moves lower during calculation, the score may indicate that the merchant is not a merchant the cardholder would typically transact business with, and as such, may be an indication of out-of-pattern transaction behavior.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.). As used herein, financial transaction data includes a unique account number associated with an account holder using a payment card issued by an issuer, purchase data representing a purchase made by the cardholder, including a type of merchant, amount of purchase, date of purchase, and other data, which may be transmitted between any parties of multi-party payment card network system 20.

In a typical transaction card system, a financial institution called the "issuer" issues a transaction card, such as a credit card or other payment card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or a merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as, and without limitation, a type of merchant, a merchant identifier, a location where the transaction was completed, an amount of purchase, and a date and time of the transaction, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 22 purchases travel, such as airfare, a hotel stay, and/or a rental car, at least partial itinerary information is transmitted during the clearance process as transaction data. When interchange network 28 receives the itinerary information, interchange network 28 routes the itinerary information to database 120.

For debit card transactions, when a request for a personal identification number (PIN) authorization is approved by the issuer, cardholder's account 32 is decreased. Normally, a charge is posted immediately to cardholder's account 32. The payment card association then transmits the approval to the acquiring processor for distribution of goods/services or information, or cash in the case of an automated teller machine (ATM).

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
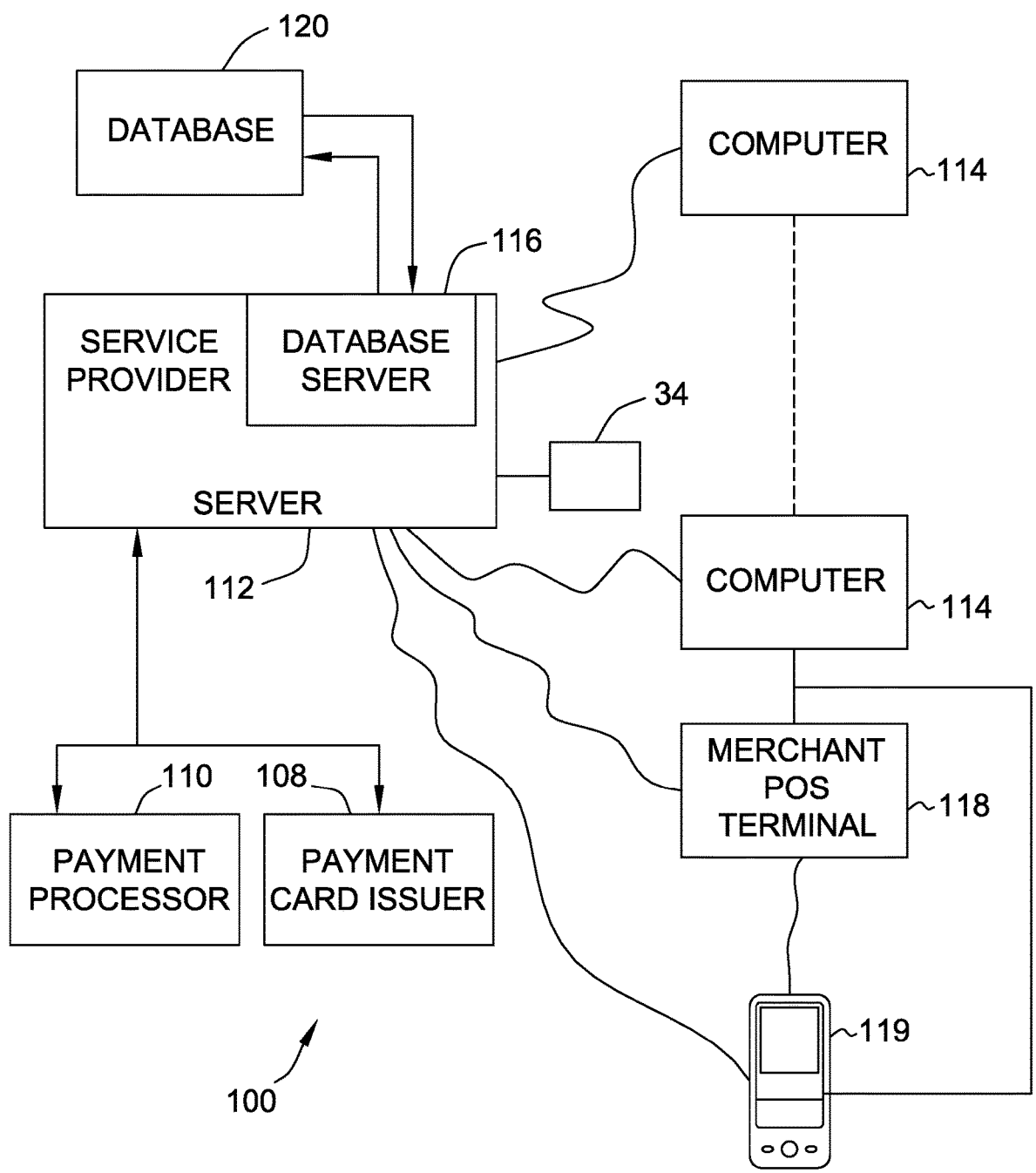

FIG. 2 is a simplified block diagram of an example payment card network system 100 including a plurality of computer devices and inverse recommender module 34. In the example embodiment, the plurality of computer devices includes, for example, a server system 112, client systems 114, and inverse recommender module 34. In one embodiment, payment card network system 100 implements a process to generate inverse recommender scores for merchants 24. More specifically, inverse recommender module 34 is in communication with server system 112 and is configured to receive at least a portion of the financial transaction data relating to financial transactions between a plurality of merchants and cardholders or account holders. The financial transaction data includes information the merchant, such as a location, and the received financial transaction data is stored in a memory device.

More specifically, in the example embodiment, payment card network system 100 includes server system 112 and a plurality of client sub-systems, also referred to as client systems 114, connected to server system 112. Server system 112 is also in communication with a payment processor 110 and/or a payment card issuer 108, such as issuer bank 30 (shown in FIG. 1). Payment processor 110 and/or server system 112 may be associated with interchange network 28 (shown in FIG. 1). Server system 112 is configured to receive transaction data from payment processor 110.

In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

Payment card network system 100 also includes point-of-sale (POS) terminals 118, which may be connected to client systems 114 and may be connected to server system 112. Point-of-sale (POS) terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

In the example embodiment, payment card network 100 may be configured to process authorization messages, such as ISO 8583 compliant messages and ISO 20022 compliant messages. As used herein, "ISO" refers to a series of standards approved by the International Organization for Standardization (ISO is a registered trademark of the International Organization for Standardization of Geneva, Switzerland). ISO 8583 compliant messages are defined by the ISO 8583 standard which governs financial transaction card originated messages and further defines acceptable message types, data elements, and code values associated with such financial transaction card originated messages. ISO 8583 compliant messages include a plurality of specified locations for data elements. ISO 20022 compliant messages are defined by the ISO 20022 standard. For example, ISO 20022 compliant messages may include acceptor to issuer card messages (ATICA).

A database server 116 is connected to database 120, which contains information on a variety of matters, as described below in greater detail. In one embodiment, centralized database 120 is stored on server system 112 and can be accessed by potential cardholders at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of an account holder's name, an account holder's address, a primary account number (PAN) associated with the account holder's name, and other account identifier. Database 120 may also store merchant data including a merchant identifier that identifies each merchant registered to use the network, and instructions for settling transactions including merchant bank account information. Database 120 may also store purchase data associated with items being purchased by an account holder from a merchant, and authorization request data. Database 120 may store picture files associated with the item or service for sale by the merchant, name, price, description, shipping and delivery information, instructions for facilitating the transaction, and other information to facilitate processing according to the method described in the present disclosure.

In the example embodiment, one of client systems 114 may be associated with merchant bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by an account holder making an on-line purchase or payment. Server system 112 may be associated with interchange network 28. In the example embodiment, server system 112 is associated with a financial transaction processing network, such as interchange network 28, and may be referred to as an interchange computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment processing system, a biller, and/or an inverse recommender module 34. Inverse recommender module 34 may be associated with interchange network 28 or with an outside third party in a contractual relationship with interchange network 28. Accordingly, each party involved in processing transaction data are associated with a computer system shown in payment card network system 100 such that the parties can communicate with one another as described herein.

Figure 3:
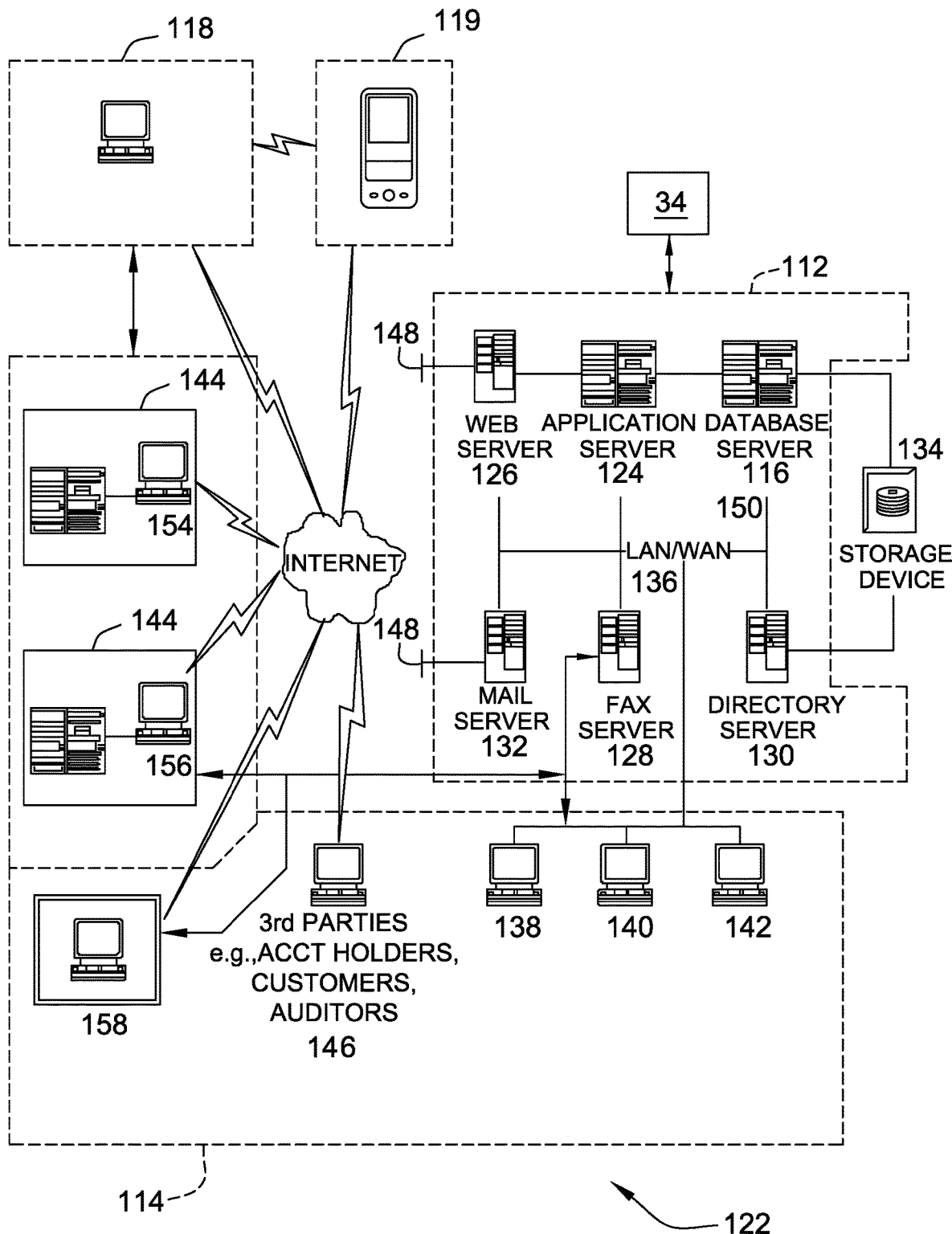

FIG. 3 is an expanded block diagram of an example embodiment of an architecture of a server system 122 of payment card network system 100. Components in system 122, identical to components of payment card network system 100 (shown in FIG. 2), are identified in FIG. 3 using the same reference numerals as used in FIG. 2. For example, inverse recommender module 34 is similarly labeled in FIGS. 1-3. System 122 includes server system 112, client systems 114, POS terminals 118, and at least one input device 119, such as a cardholder computing device. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to inverse recommender module 34 and various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 158 using a telephone link. Fax server 128 is configured to communicate with other client systems 138, 140, and 142 as well.

Figure 4:
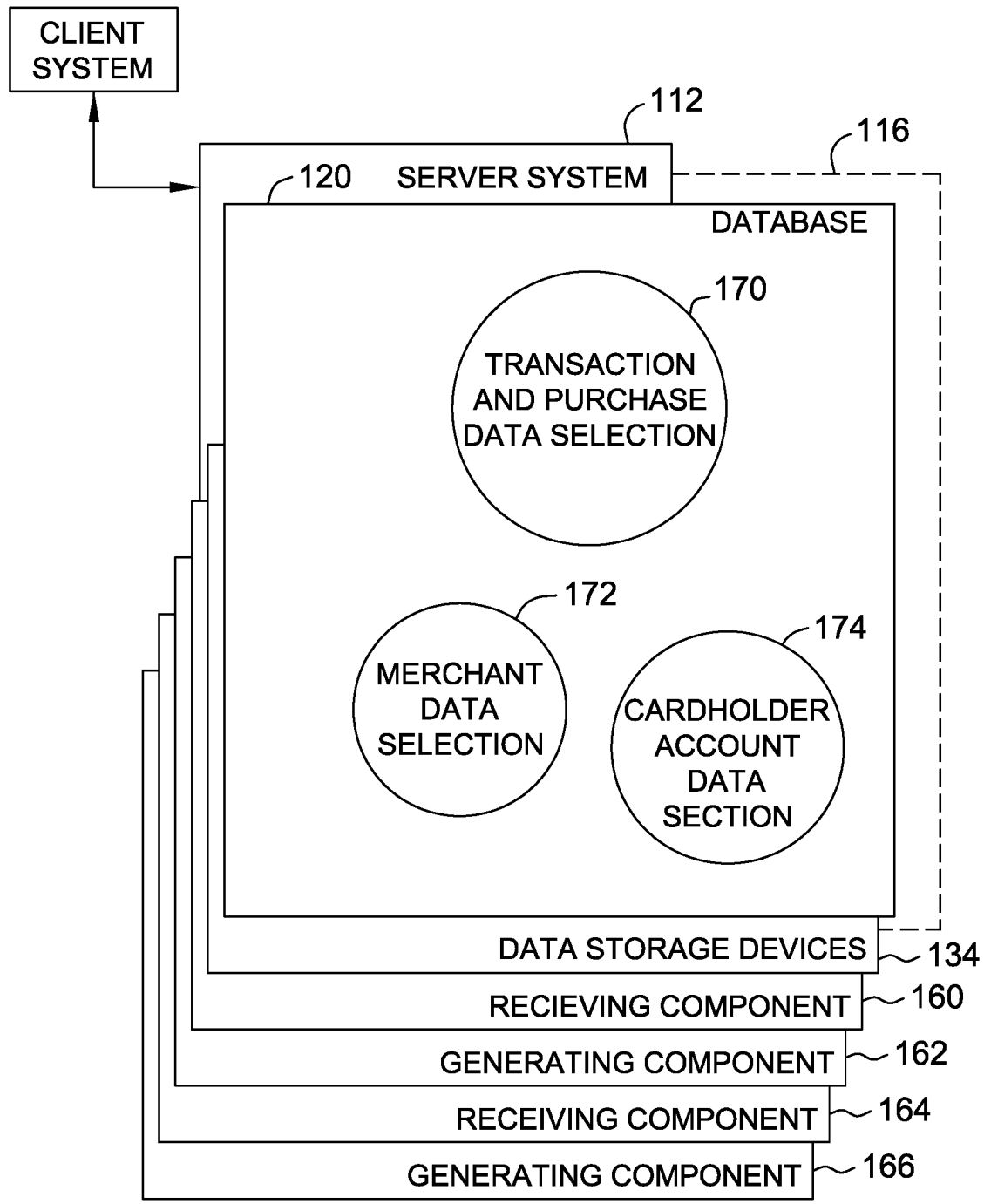

FIG. 4 shows a configuration of database 120 within database server 116 of server system 112 with other related server components. More specifically, FIG. 4 shows a configuration of database 120 in communication with database server 116 of server system 112 shown in FIGS. 2 and 3. Database 120 is coupled to several separate components within server system 112, which perform specific tasks.

Server system 112 includes a receiving component 160 for receiving financial transaction data corresponding to financial transactions between a plurality of cardholders or account holders and a plurality of merchants, a generating component 162 for generating a merchant correspondence matrix that includes the plurality of merchants and a plurality of counts of interactions associated with pairs of the plurality of merchants, the plurality of counts of interactions tallying total financial transactions conducted by the plurality of cardholders or account holders at both of the merchants in a pair of the plurality of merchants, a receiving component 164 for receiving financial transaction data corresponding to a discrete financial transaction between a specific cardholder or account holder and a merchant, and a generating component 166 for generating a list of inverse recommender scores for merchants based on an inverse recommender algorithm.

In an example embodiment, payment card network system 100 includes an administrative component (not shown) that provides an input component as well as an edit component to facilitate administrative functions. Payment card network system 100 is flexible to provide other alternative types of reports and is not constrained to the options set forth above.

In one example embodiment, database 120 is divided into a plurality of sections, including but not limited to, a Transaction and Purchase Data Section 170, a Merchant Data Section 172, and a Cardholder Account Data Section 174. These sections within database 120 are interconnected to update and retrieve the information described herein as required.

Figure 5:
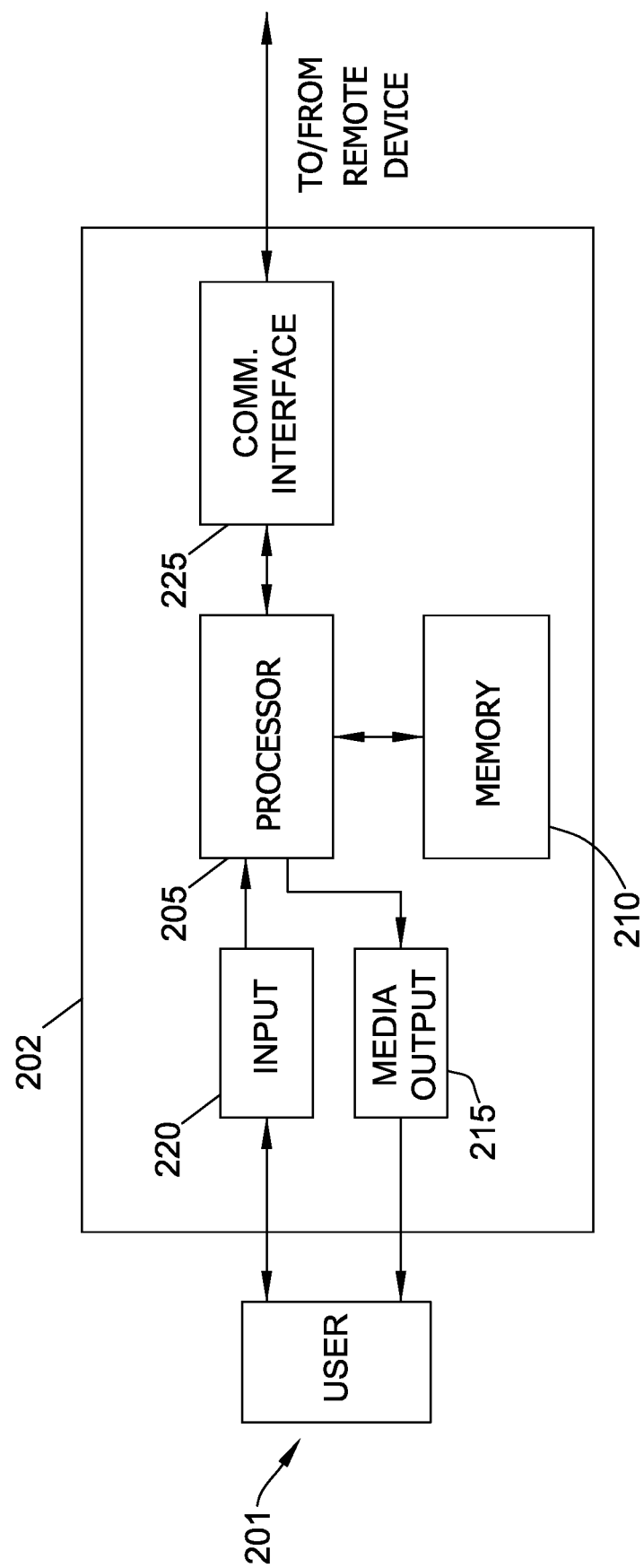

FIG. 5 illustrates an example configuration of a user system 202 operated by a user 201, such as cardholder 22 (shown in FIG. 1). User system 202 may include, for example, and without limitation, client systems 114, 138, 140, 142, 144, 146, POS terminal 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or other data to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, 4G or Bluetooth or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Memory area 210 may include, for example, and without limitation, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
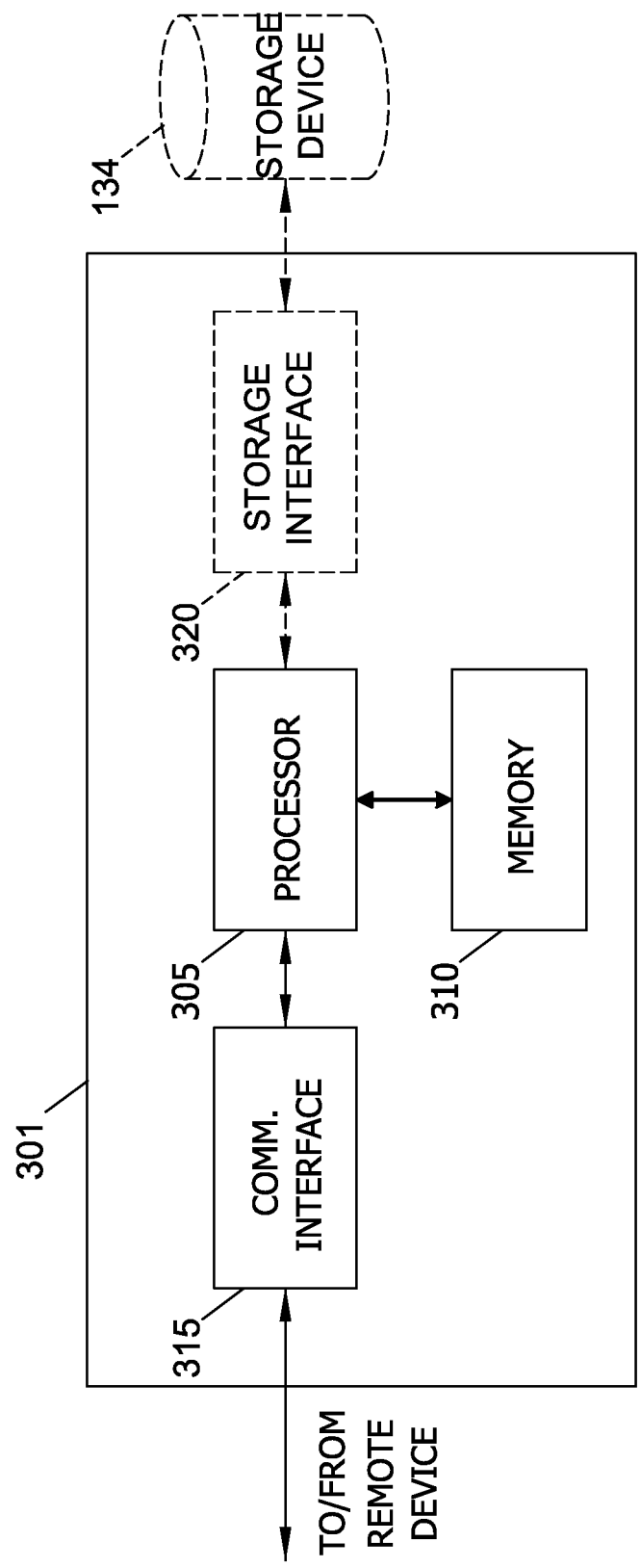

FIG. 6 illustrates an example configuration of a server system 301 such as server system 112 (shown in FIGS. 2-4). Server system 301 may include, for example, and without limitation, database server 116, transaction server 124, web server 126, fax server 128, directory server 130, and mail server 132. In the example embodiment, server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2-4. Processor 305 may also be operatively coupled to a storage device 134. Storage device 134 is any computer-operated hardware suitable for storing and/or retrieving data. In some embodiments, storage device 134 is integrated in server system 301. For example, and without limitation, server system 301 may include one or more hard disk drives as storage device 134. In other embodiments, storage device 134 is external to server system 301 and may be accessed by a plurality of server systems 301. For example, and without limitation, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, and without limitation, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, for example, and without limitation, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 7:
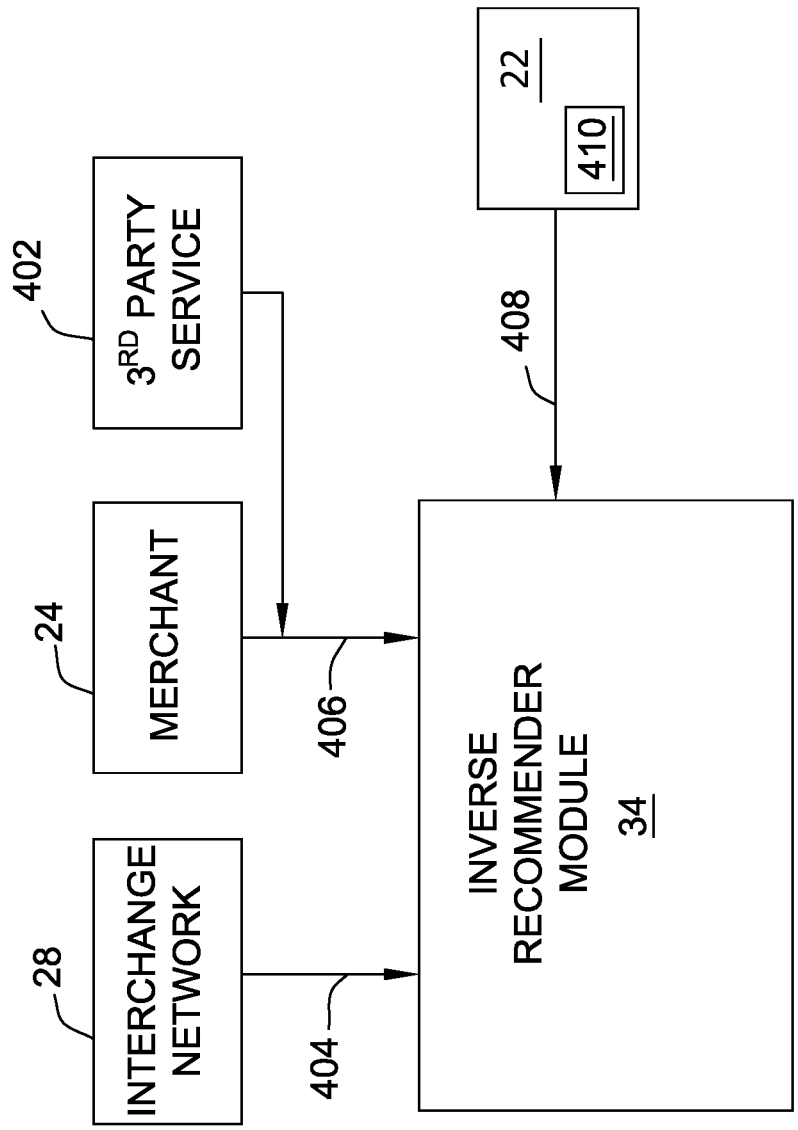

FIG. 7 is a block diagram showing operation of inverse recommender module 34 (shown in FIG. 1). Inverse recommender module 34 is configured to receive historical transaction data for a plurality of cardholders transacting with a plurality of merchants, receive cardholder transaction data, and output an inverse recommender score generated by inverse recommender module 34 based on the received data. In the example embodiment, inverse recommender module 34 is in communication with a payment network, such as payment card interchange network 28 (shown in FIG. 1), for receiving transaction data.

In the example embodiment, inverse recommender module 34 is programmed to communicate with interchange network 28 to receive transaction information 404 for a plurality of payment cardholders. Interchange network 28 is configured to process payment card transactions between merchants 24 associated with merchant banks 26, and cardholders 22 associated with issuer banks 30. Payment card transaction information 404 includes data relating to purchases made by a plurality of cardholders 22 at a plurality of merchants 24, for example, and without limitation, during a predetermined time period, within a predetermined geographical region, and/or some other criteria applied to the data. That is, payment card transaction information 404 includes historical transaction information for the plurality of cardholders 22, which may be limited by some criteria applied to the data.

In some embodiments, inverse recommender module 34 may be further programmed to receive merchant descriptive information 406 from merchant 24 or from a third party service 402. Merchant descriptive information 406 includes information relating to location, hours of operation, upcoming events, entertainment provided, and advertising and promotional information. Merchant descriptive information 406 may be stored in database 120 (shown in FIG. 2) associated with interchange network 28.

Furthermore, in some example embodiment, inverse recommender module 34 may also be programmed to determine location information for each of the plurality of merchants 24 relative to a predetermined selectable location and/or a current location 408 of cardholder 22. For example, a cardholder that uses cardholder computing device 119 (shown in FIG. 2) having GPS capability 410 can use the determined location information to determine a distance of merchants from a current location of cardholder 22.

In the example embodiment, inverse recommender module 34 is also programmed to determine an inverse recommender score for each of the plurality of merchants 24 using the received transaction information 404 and a discrete transaction of a particular cardholder 22. The inverse recommender score indicates a relative likelihood that cardholder 22 would initiate a transaction with that merchant relative to the cardholder's past transaction history, as described in more detail herein.

Figure 8:
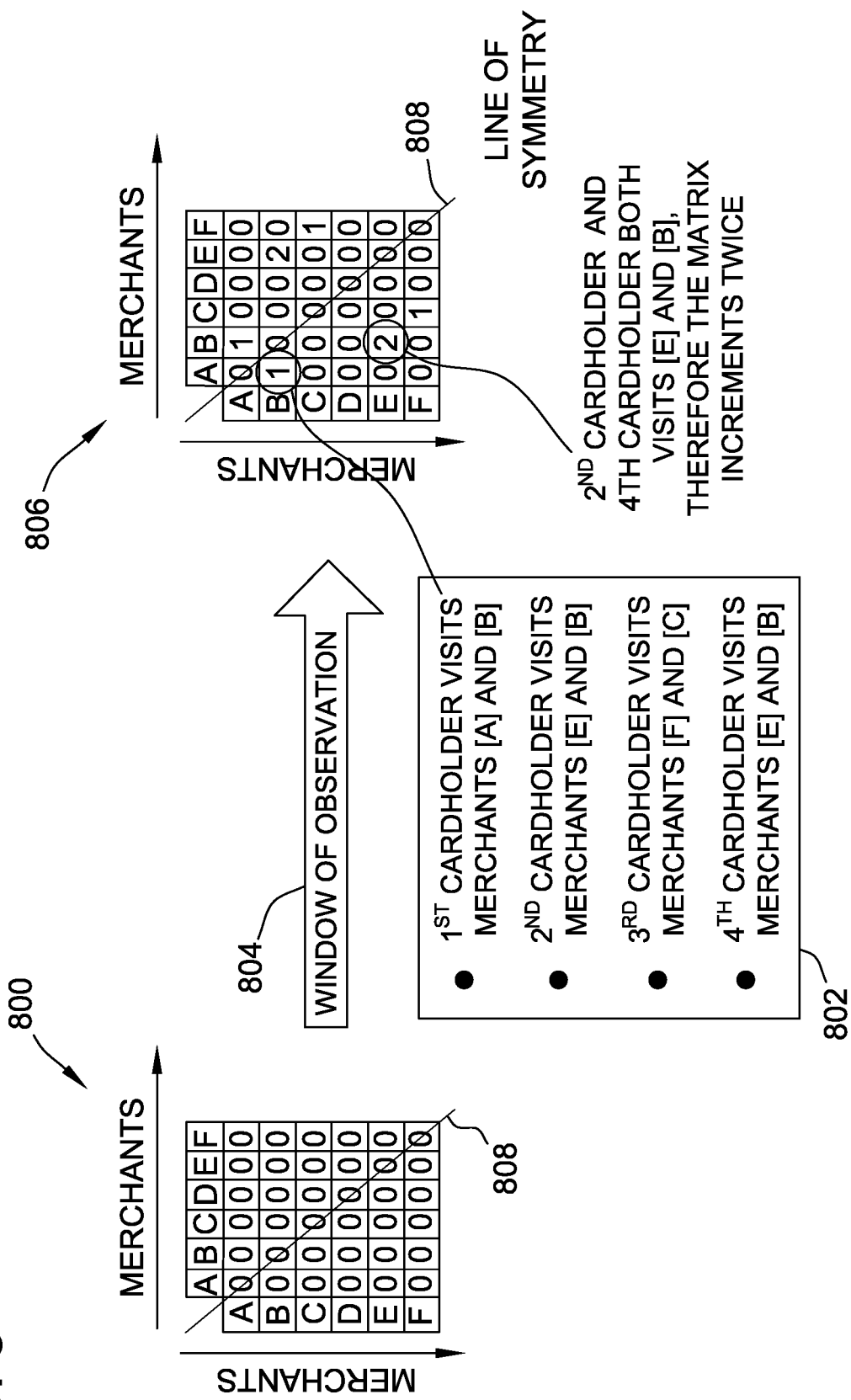

FIG. 8 is a block diagram showing the process of generating a sparse merchant correspondence matrix 806. In the example embodiment, inverse recommender module 34 inputs merchants 24 (shown in FIG. 1) associated with a plurality of cardholders' financial transactions during a specified time period, for example, into a null matrix 800, which is stored in a database, such as database 120 (shown in FIG. 2). As shown in FIG. 8, the vertical and horizontal axes of null matrix 800 include all merchants associated with the plurality of cardholders' financial transactions during the specified time period. For example, in one embodiment, the merchants are ordered the same and the merchant row and column extends from a common origin such that a line of symmetry 808 extends diagonally through the matrix. It is noted that null matrix 800 is a symmetric matrix. In particular, the transaction data 802 is received and stored in the database (e.g., database 120) and arranged such that transactions between pairs of merchants during a window of observation 804 by a cardholder are linked to the cardholder's account. The transaction data 802 between pairs of merchants is used to populate null matrix 800 to generate a symmetric sparse merchant correspondence matrix 806. For example, and without limitation, in one embodiment, sparse merchant correspondence matrix 806 may be generated using four months of cardholders' financial transaction data. Alternatively, sparse merchant correspondence matrix 806 may be generated using any amount of cardholders' financial transaction data that enables inverse recommender module 34 to function as described herein.

In the example embodiment, initial null matrix 800 includes, for example, merchants A, B, C, D, E, and F along the vertical and horizontal axes. Inverse recommender module 34 obtains transaction data 802 for cardholders that have transacted with merchants A, B, C, D, E, and/or F during a specified time period or window of observation 804. Transaction data 802 is provided by a payment network, such as payment card interchange network 28 (shown in FIG. 1). Using transaction data 802, inverse recommender module 34 populates null matrix 800 to obtain sparse merchant correspondence matrix 806. In the example embodiment, a cardholder must have transacted with two or more of merchants A, B, C, D, E, and/or F during the specified time period or window of observation 804 in order for the cardholder's transaction data to be counted in sparse merchant correspondence matrix 806. This facilitates reducing an effect of cardholder bias toward a single merchant. The transactions between the cardholder and the merchants can occur anytime during the window of observation 804.

In the example embodiment, for each pair of merchants a cardholder has transacted with, inverse recommender module 34 increments a counter associated with the merchant pair. For example, as shown in FIG. 8, a $1^{st}$ cardholder executed transactions with merchants A and B during the window of observation 804. As indicated above, the transactions with A and B do not need to occur on the same date, but only need to occur within the window of observation 804. Based on these transactions, inverse recommender module 34 increments a value stored in block (A, B) of sparse merchant correspondence matrix 806 by a value of one. Additionally, block (B, A) is incremented by a corresponding value of one. As shown in transaction data 802, both the $2^{nd}$ and $4^{th}$ cardholders executed transactions with merchants E and B. Accordingly, inverse recommender module 34 increments blocks (E, B) and (B, E) of merchant correspondence matrix 806 by a value of two. As such, sparse merchant correspondence matrix 806 is generated as a symmetric matrix having line of symmetry 808 of null values.

After sparse merchant correspondence matrix 806 is populated with all of transaction data 802, sparse merchant correspondence matrix 806 provides a measure of the associations between pairs of merchants 24 based on how often the plurality of cardholders transacts with both merchants of the pair. Sparse merchant correspondence matrix 806 is stored in the database. In particular, transaction data 802 is stored in the database and the memory arranged such that transactions between pairs of merchants during the window of observation 804 by a cardholder are linked to the cardholder's account.

Additionally, sparse merchant correspondence matrix 806 provides an indication of a popularity of each merchant relative to the other merchants based on historical transaction data, free from cardholder bias, across a plurality of cardholders. While the increment values are described above in units of one, it is noted that the values can be any predetermined non-zero value that enables inverse recommender module 34 to function as described herein.

Figure 9:
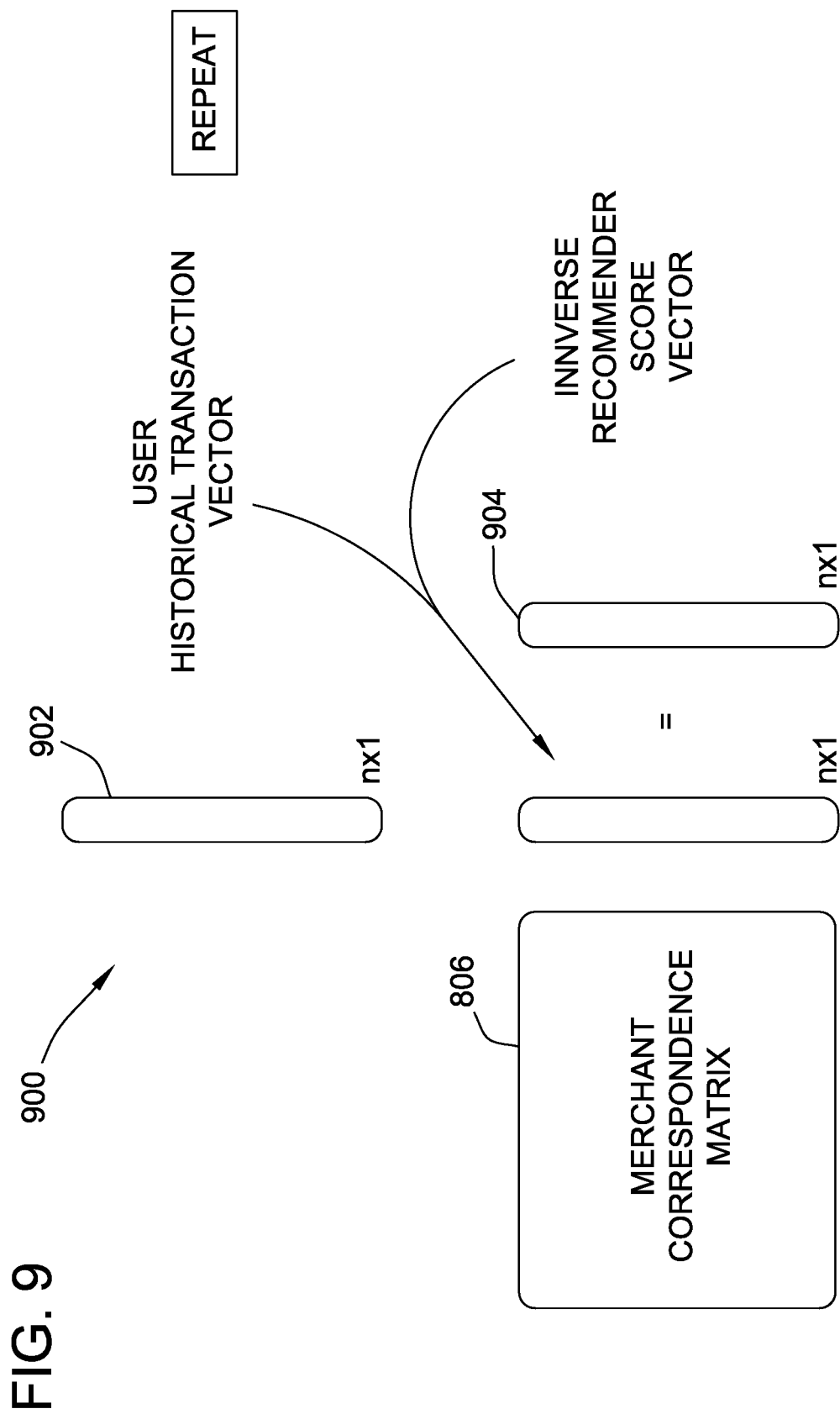

FIG. 9 is an illustration 900 of steps performed in inverse recommender module 34. In the example embodiment, inverse recommender module 34 begins with sparse merchant correspondence matrix 806 that includes all pairs of represented merchants 24, and with a starting value populated in each cell at the intersection of the pair of merchants' columns and rows, as described above. In one embodiment, sparse merchant correspondence matrix 806 may be normalized such that each column sums to 1.

Inverse recommender module 34 generates a user historic transaction vector 902 for each cardholder and stores them in a database, such as database 120. User historic transaction vector 902 is a column vector of size n×1 and includes each merchant 24 (denoted by n) included in sparse merchant correspondence matrix 806. To generate each user historic transaction vector 902, a non-zero initial value is set for each merchant in user historic transaction vector 902. For each merchant where a transaction has occurred by the cardholder, the non-zero initial value is given a greater value in user historic transaction vector 902. In one embodiment, for example, the non-zero initial value may be set to 1/(the total # of merchants in the matrix), and the value for each merchant where a previous cardholder transaction has occurred may be set to 1/(the # of transaction merchants). For example, with reference to FIG. 8, there are a total number of six merchants included in sparse merchant correspondence matrix 806. Thus, the non-zero initial value for each merchant in user historic transaction vector 902 may be ⅙, or 0.167 for each entry in user historic transaction vector 902. If the cardholder transacted business with two of the merchants, those merchant values in the cardholder's user historic transaction vector 902 would be increased to ½, or 0.5. As with sparse merchant correspondence matrix 806, user historic transaction vector 902 may be normalized such that the column vector sums to 1.

In the example embodiment, after a transaction by a cardholder is executed at a merchant that the cardholder has not previously transacted business with, user historic transaction vector 902 is used to generate an inverse recommender score vector 904. In particular, inverse recommender module 34 executes a matrix-vector multiplication function and multiplies sparse merchant correspondence matrix 806 by user historic transaction vector 902. This multiplication may be thought of as placing a large amount of activation into the merchant network at the locations previously visited by the cardholder. After the initial computation, the inverse recommender score vector 904 is used as the new vector in the matrix-vector multiplication function. Repeating the computation a selectable number of times has the effect of distributing the activation through the merchant network.

In some embodiments, after the initial computation, the inverse recommender score vector 904 may be combined with the historic transaction vector 902 using a weighting technique. For example, and without limitation, the inverse recommender score vector 904 may be weighted by multiplying it by a weighting factor, and subsequently added to the historic transaction vector 902, which is multiplied by a weighting factor. The resultant weighted combination vector is then used in the next iteration. This method may be repeated a predetermined number of times. For example, the following equation may be used to determine the weighted combination vector.

$$C=xA+(1-x)B$$

Where x equals the weighting factor (e.g., a constant value), A equals the inverse recommender score vector 904, B equals the historic transaction vector 902, and C is the weighted combination vector. In the above equation, x is a value between zero and one.

In the example embodiment, the inverse recommender score for each merchant is the final value of the merchant slot in the inverse recommender score vector 904 or the weighted combination vector after executing the matrix-vector multiplication function the selected number of times. To determine whether a particular transaction with a new merchant is out-of-pattern transaction behavior for the cardholder, the proportionate change in merchant's score or value between the initial user historic transaction vector 902 and the inverse recommender score vector 904 is compared. If the cardholder's transaction history causes the score for the new merchant to increase significantly, then that means the cardholder's transaction history is nearby that merchant. If the cardholder's transaction history causes the score to decrease, or increase only slightly relative to other merchants, that is an indication that the particular transaction is out-of-pattern for the cardholder. That is, for purposes of determining out-of-pattern transactions, more weight is given based on a percentage change of the inverse recommender score for each merchant. If the percentage change in score is negative or proportionately small compared to other merchants, the new transaction is determined to be out-of-pattern for the cardholder.

In one example embodiment, inverse recommender module 34 determines the inverse recommender score for each new merchant transaction on a real-time basis. For example, and without limitation, when a cardholder executes a transaction at a merchant that is not part of the cardholder's transaction history, inverse recommender module 34 executes the matrix-vector multiplication function to determine the inverse recommender score for that new merchant. If the inverse recommender score indicates that the transaction is an out-of-pattern transaction for the cardholder, inverse recommender module 34 transmits the inverse recommender score to, for example, a payment processor, such as payment processor 110 (shown in FIG. 2), a payment card issuer, such as issuer bank 30 (shown in FIG. 1), and/or any other requesting client system. The payment processor, issuer, and/or other requesting client system may flag the transaction for additional investigation.

Alternatively, or in addition, in another embodiment, if the inverse recommender score indicates that the transaction is an out-of-pattern transaction for the cardholder, inverse recommender module 34 transmits an out-of-pattern transaction alert to the payment processor, the issuer, and/or any other requesting client system. The alert received from inverse recommender module 34 activates a fraud scoring system of the payment processor, issuer bank, and/or other requesting client system so the out-of-pattern transaction is flagged as being high risk for fraud. The fraud scoring system, for example, is an additional layer of protection for the payment processor, issuer bank, and/or other requesting client system that facilitates detecting potentially fraudulent transactions. The fraud scoring system may receive authorization request messages, including transaction information, when a cardholder initiates a transaction. The fraud scoring system may use a variety of fraud scoring algorithms to generate a fraud score, which may indicate the likelihood that the transaction is fraudulent. If the fraud score generated by the fraud scoring system meets a threshold level (i.e., that the transaction is potentially fraudulent), the fraud scoring system may generate a fraud scoring response message. While the fraud scoring system may facilitate detection of fraudulent transactions, they may also recommend approving fraudulent transactions (also known as false positives) or denying genuine transactions (also known as false negatives). The fraud score may be based on a comparison of data contained in the authentication request and historical cardholder transactions and authenticate or reject the authentication request based on whether the fraud score exceeds a predetermined fraud threshold.

In another example embodiment, if the inverse recommender score indicates that the transaction is an out-of-pattern transaction for the cardholder, inverse recommender module 34 automatically transmits an out-of-pattern transaction alert to the payment processor, the issuer, and/or any other requesting client system. When the out-of-pattern transaction alert is received from inverse recommender module 34, the transaction is declined at POS terminal, such as POS terminal 118 (shown in FIG. 2), in real-time. That is, the transaction is denied while the potentially fraudulent transaction is being performed.

Figure 10:
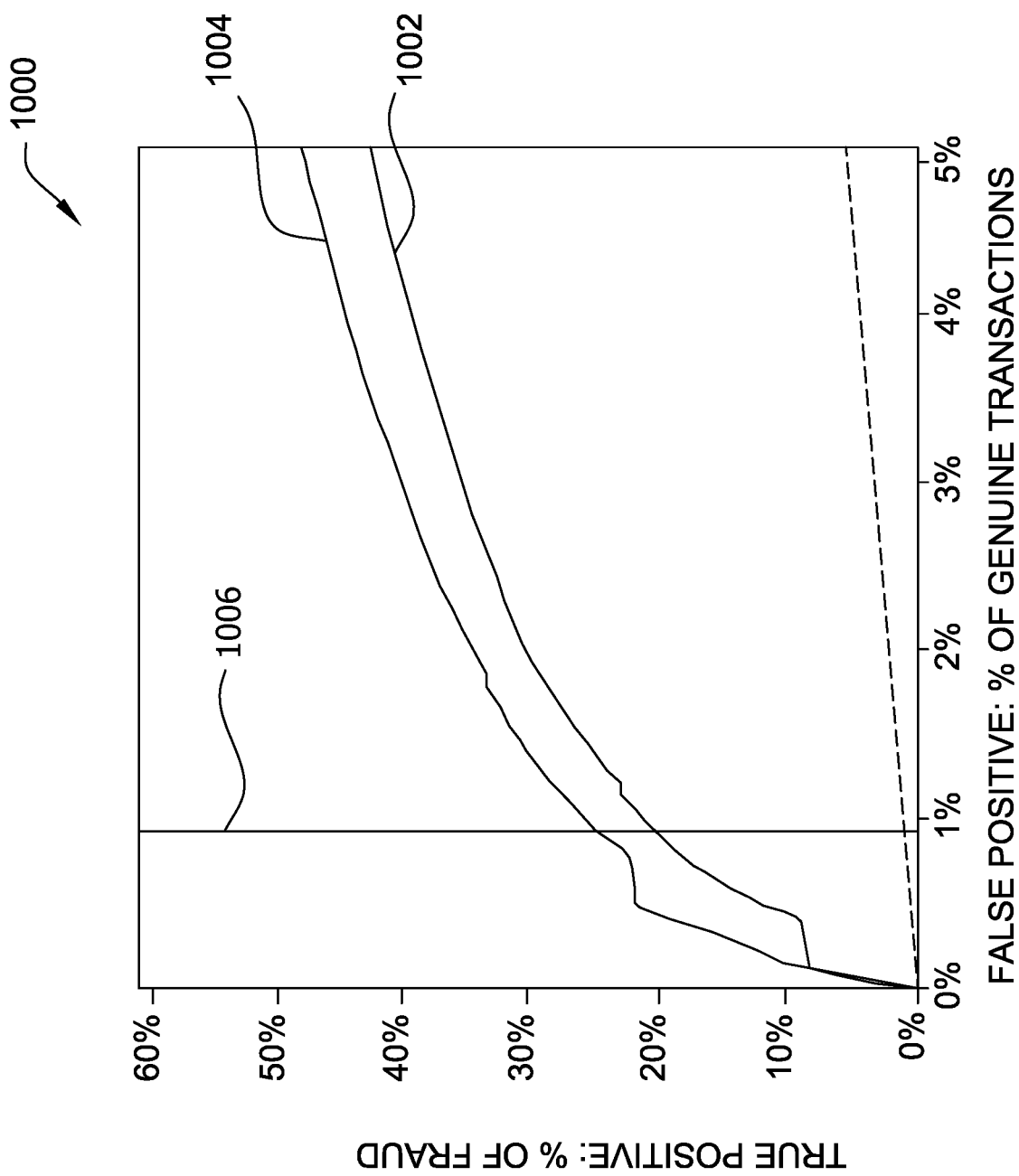

FIG. 10 is a plot 1000 of a fraud score, indicated by line 1002, and a combination fraud score, indicated by line 1004. In the example embodiment, the combination fraud score is a combination of the fraud score and the inverse recommender score for a merchant. The X-axis of plot 1000 is an indication of the percentage of transactions that are false positives, i.e., transactions that may be indicated as fraudulent, but are not really fraud. The Y-axis of plot 1000 is an indication of the percentage of transactions that are true positives, i.e., transactions that may be indicated as fraudulent, and are determined to be actual fraud. As you move from left to right along the X-axis, it can be visualized as lowering the predetermined fraud threshold, described above. In the example embodiment, threshold line 1006 extends vertically and is representative of the predetermined fraud threshold, for example, and without limitation, about 0.9% in this embodiment. The predetermined fraud threshold, i.e., threshold line 1006, is the threshold value at which a merchant would further investigate the transaction before completion.

In the exemplary embodiment, fraud score line 1002 climbs upward from the origin of plot 1000 and extends along the X-axis. Fraud score line 1002 crosses threshold line 1006 at approximately the 20% mark on the Y-axis. As such, fraud score line 1002 indicates that using the fraud score alone, approximately 20% of actual fraud is identified at a 0.9% false positive threshold. That is, for all transactions, 20% of the fraud is detected while only affecting 0.9% of the transactions. Combining the inverse recommender score determined by inverse recommender module 34 with the fraud score results in combination fraud score line 1004. As shown in FIG. 10, combination fraud score line 1004 crosses threshold line 1006 at approximately the 24% mark on the Y-axis. As such, the combination fraud score can detect about 24% of all fraud while only affecting 0.9% of the transactions. Thus, the combination of the inverse recommender score with the fraud score increases the fraud detection rate about 20% over the fraud detection rate of the fraud score alone.

In another alternative embodiment, inverse recommender module 34 is used with other known authentication methods to facilitate authentication of the transaction. When a transaction at a new merchant is initiated, inverse recommender module 34 may compute the inverse recommender score for the new merchant. If the inverse recommender score indicates that the transaction is out-of-pattern for the cardholder, the transaction may be flagged for or elevated to step-up authentication. For a step-up authentication transaction, additional authentication measures may be taken before the transaction is authorized. For example, and without limitation, in one embodiment, a cardholder may be prompted for two factor authentication before the transaction may be authorized.

In another embodiment, inverse recommender module 34 can be used in post hoc analytics. For example, and without limitation, if fraud and/or some other compromise is suspected or discovered, the inverse recommender score can be used to facilitate discovery and/or analysis of the suspected compromise. With some exploitations or compromises, there is a point where there are some early warnings, such as when a bunch of the transaction cards are tested in some unusual way, and the inverse recommender score can be utilized to identify such test and probe operations early because those transactions are very out-of-pattern for the associated cardholders.

Figure 11:
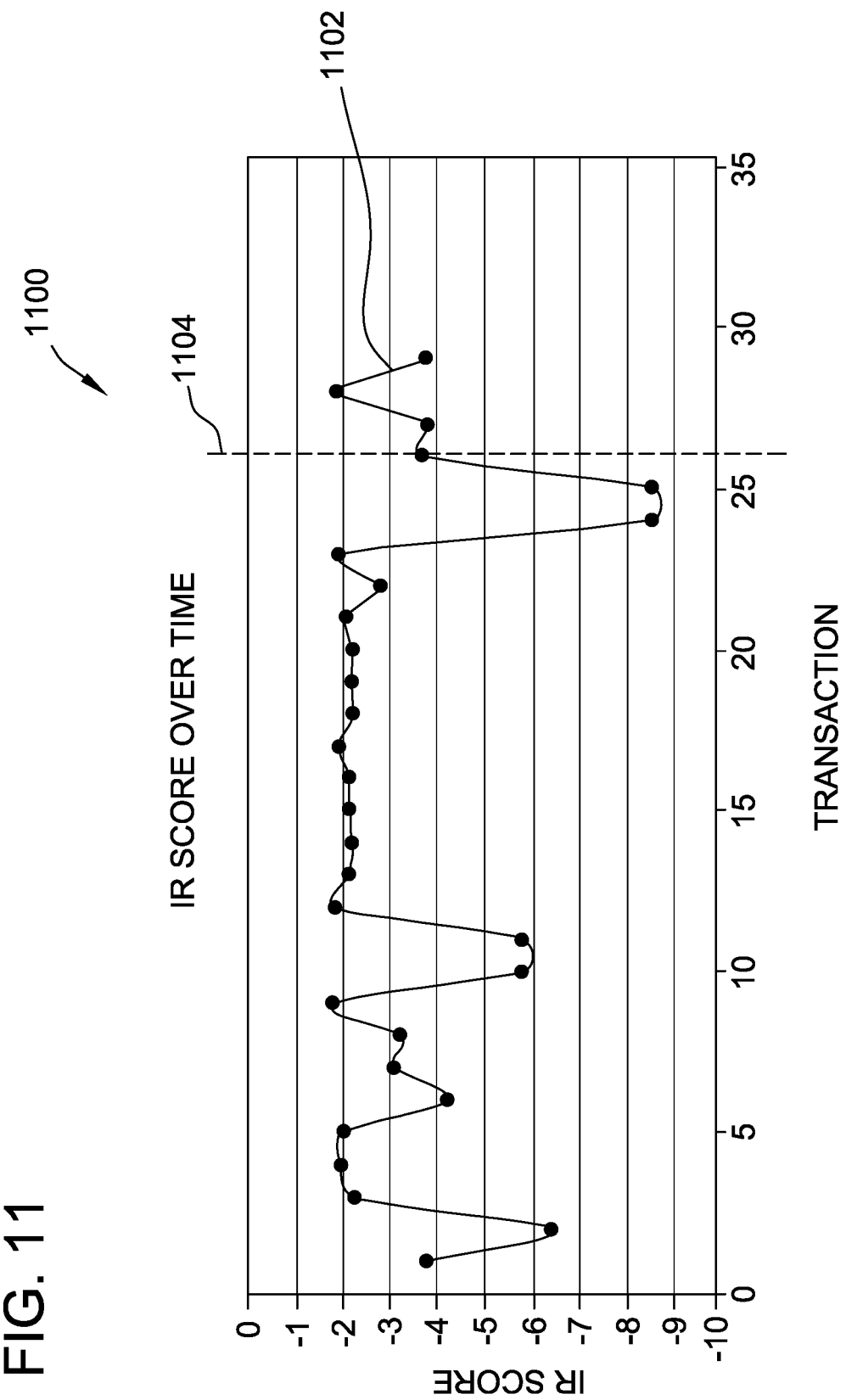

FIG. 11 is a plot 1100 of a cardholder's inverse recommender score 1102 for a series of transactions. In the example embodiment, the X-axis of plot 1100 is a series of transactions, for example, a sample of thirty-five transactions. The Y-axis of plot 1100 is the inverse recommender score as determined by inverse recommender module 34. In one embodiment, the inverse recommender score is calculated by inverse recommender module 34 in real-time. Alternatively, in other embodiments, the inverse recommender score is calculated by inverse recommender module 34 after the transactions have occurred, such in a post hoc analysis operation. In the example embodiment, plot 1100 shows the inverse recommender score where a higher value means that the transaction is self-consistent and a lower value is an indication of out-of-pattern behavior for this particular transaction card.

As shown in plot 1100, the inverse recommender score shows some fluctuations up and down as the card is used at various merchants, eventually settling into a pattern that is normal for the cardholder of the transaction card, for example, at a value of about −2. Transactions 24 and 25, however, drop significantly to a value between −8 and −9. This indicates that these two transactions are determined to be very unusual, or out-of-pattern for the cardholder of the transaction card. For example, and without limitation, these transactions may be an indication of fraudulent transactions. In some embodiments, such transactions may be small transactions designed to test and probe the transaction card, and then later on, there's actually fraud for a larger dollar amount. For example, line 1104, which is associated with transaction 27, represents reported actual fraud associated with transaction 27.

The inverse recommender score associated with the actual fraud transaction may not trigger a fraud alert because the exploitation of the transaction card may occur at a merchant where the cardholder typically transacts business. It is common that fraudsters test and probe a transaction card at one merchant and then they used the transaction card at a different merchant for a larger transaction amount. For example, the larger transaction may be for gift cards at a major retail chain merchant. The initial test and probe transactions may not be identified or raise concerns using known fraud detection techniques. An advantage of inverse recommender module 34 and the determination of the inverse recommender score is that out-of-pattern transactions are detected as they occur even though such initial transactions might not be where a significant fraud loss occurs. As such, inverse recommender module 34 provides an advantage of detecting and flagging potential test and probe transactions.

Figure 12:
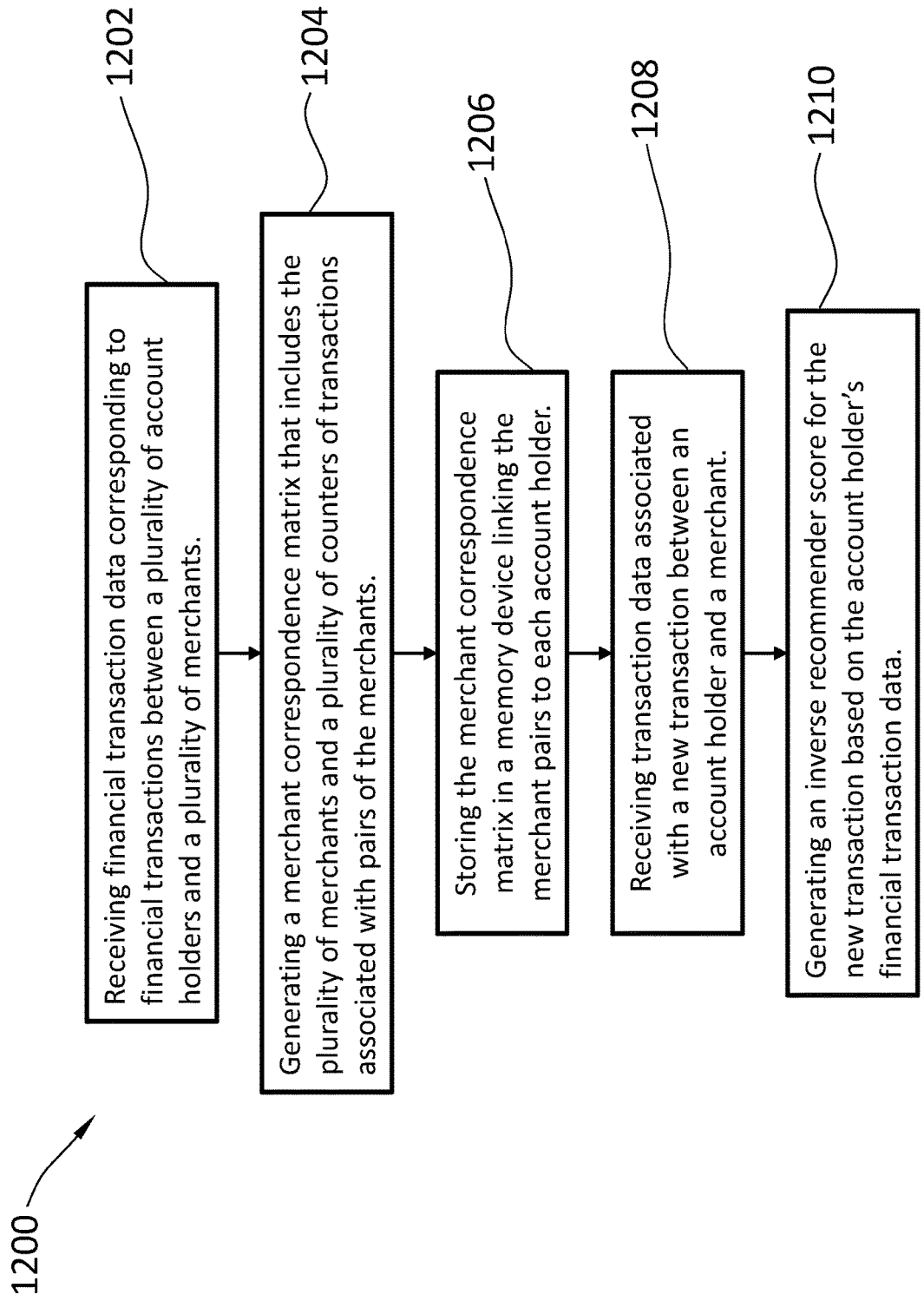

FIG. 12 is flow chart of an example method 1200 for detecting out-of-pattern payment card transactions using a computer device coupled to a memory device. In the example embodiment, method 1200 is implemented by inverse recommender module 34 (shown in FIG. 2). Method 1200 is a computer-based method for detecting out-of-pattern payment card transactions based on the cardholder's historical purchasing pattern, i.e., detecting a fraudulent transaction with a merchant based on the transaction being outside the historical purchasing pattern of the cardholder. The method is implemented using an inverse recommender module or computer device coupled to a memory device. The inverse recommender module is communicatively coupled to a payment processor, for example, through a network. Additionally, a matrix processor, which may be a separate data structure stored on a separate data storage and retrieval device, is also communicatively coupled to the payment processor through the network or through a private network, such as, but not limited to a LAN. The method includes receiving 1202 financial transaction data corresponding to financial transactions between a plurality of account holders and a plurality of merchants. In one embodiment, the financial transaction data is received by the inverse recommender module from the payment processor over the network. In other embodiments, the matrix processor receives the financial transaction data directly from the payment processor.

The method also includes generating 1204 a merchant correspondence matrix that includes the plurality of merchants and a plurality of counts of interactions associated with pairs of the plurality of merchants, and storing 1206 the merchant correspondence matrix in a memory device linking the merchant pairs to each account holder of the plurality of account holders. The plurality of counts of interactions is used to tally total financial transactions conducted by the plurality of account holders at both of the merchants in at least one of the pairs of the plurality of merchants. For example, in one embodiment, each cardholder that has transacted business at more than one merchant, the inverse recommender module updates the merchant correspondence matrix with the transaction information. More specifically, a counter is associated with each merchant within the merchant correspondence matrix. For each pair of merchants visited by each cardholder, the inverse recommender module increments the counter of interactions associated with those merchants. Accordingly, the more often a cardholder transacts with a particular pair of merchants, the more associations that merchant pair will obtain within the merchant correspondence matrix.

A visual result of such a tallying of interactions is shown in FIG. 8. A plurality of merchants are represented along each of the axes of the matrix and interactions that the account holder has with two merchants is tallied at the intersection of those two merchants as found in the column representing one merchant and the row indicating the second merchant. For each interaction from all the account holders at those two merchants the cell at the intersection is incremented. The tally then can be used in an inverse recommender scoring or fraud detection scheme as an indication of tying together merchants the account holder is unlikely to use. The tally can be used in an inverse recommender scoring or fraud detection scheme as an indication of an account holder's purchasing pattern. For example, when financial transaction data is received, the inverse recommender score is calculated. If the inverse recommender score indicates that the transaction is outside the cardholder's historical pattern, the financial transaction may be declined, the inverse recommender score may be transmitted to the merchant, or the transaction may be flagged for step-up authentication to facilitate confirming a fraudulent transaction. As such, the inverse recommender module may alert the payment processor and/or account holder to the potentially fraudulent transaction.

The method also includes receiving 1208 transaction data associated with a new transaction between a merchant and a cardholder or account holder. Typically the merchant requests authorization from a merchant bank for the amount of the transaction. The inverse recommender module generates 1210 an inverse recommender score for the new transaction, based on the historic transaction data associated with the cardholder or account holder. For example, the inverse recommender module generates an initial user historic transaction vector based on historic transaction data of the cardholder or account holder and the plurality of merchants included in the merchant correspondence matrix. The inverse recommender score can be used to determine a likelihood that the transaction is fraudulent.

The inverse recommender module generates the inverse recommender score for the new transaction using the initial user historic transaction vector. The initial user historic transaction vector represents the cardholder's historic transactions with merchants included in the merchant correspondence matrix. The inverse recommender module normalizes the initial user historic transaction vector such that each merchant is given a value, and the values for the plurality of merchants in the initial user historic transaction vector sums to one, which provides a scaled initial user historic transaction vector that is biased based on the cardholder's historic transactions.

After generating the initial user historic transaction vector, the inverse recommender module multiplies the initial user historic transaction vector with the merchant correspondence matrix to determine an inverse recommender score for each of the merchants. The merchant inverse recommender score represents a level or a measure of general popularity of each merchant relative to the plurality of merchants that is adjusted according to the cardholder historic transaction information. The resulting inverse recommender score vector is multiplied by the merchant correspondence matrix a predetermined number of times. The final inverse recommender score vector is compared to the initial user historic transaction vector and the change in the merchant score associated with the current transaction is compared to the change in the other merchants. If the change in inverse recommender score is negative relative to other merchants, this is an indication of out-of-pattern behavior for the cardholder.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

The technical effects of the systems and methods described herein is achieved by performing at least one of the following steps: (a) receiving, by the inverse recommender module, first financial transaction data corresponding to historical payment card transactions between a plurality of account holders and a plurality of merchants; (b) generating a merchant correspondence matrix including the plurality of merchants and a plurality of counters indicating a number of historical payment card transactions between pairs of the plurality of merchants and the plurality of account holders based on the first financial transaction data; (c) storing the merchant correspondence matrix, including the plurality of counters, in a database; (d) receiving, by the inverse recommender module, second financial transaction data associated with a new payment card transaction between an account holder of the plurality of account holders and a merchant of the plurality of merchants; and (e) generating an inverse recommender score for the new payment card transaction based on account holder historical payment card transaction data from the first financial transaction data, where the account holder historical payment card transaction data includes historical payment card transaction data associated with the plurality of merchants visited by the account holder.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A server for receiving and detecting possibly fraudulent payment transactions, said server comprising:
a memory device for storing data; and
a processor communicatively coupled to said memory device and to a payment processing network, wherein the payment processing network routes electronic communications between a plurality of merchants and a plurality of issuers of payment cards to a plurality of account holders who have accounts with one or more of the plurality of issuers, each merchant being communicatively coupled to said processor via at least one merchant computing device where account holder payment transactions are initiated, and each issuer being communicatively coupled to said processor via an issuer computing device, wherein the server further comprises an inverse recommender module for receiving and detecting the possibly fraudulent payment transactions by detecting out-of-pattern payment transactions by one or more of the plurality of account holders;
said processor programmed to:
receive first transaction data corresponding to historical payment transactions from a predetermined time period between the plurality of account holders and the plurality of merchants, wherein the first transaction data includes, for each of the historical payment transactions, an identifier of an account associated with the respective account holder and an identifier of the respective merchant, and wherein the plurality of merchants numbers n;
link, in the memory device using the first transaction data, the account of each account holder with pairs of merchants with which the account holder transacted business during the predetermined time period;
initialize an array in the memory device, the array comprising a data structure stored in the memory device and based on the linking, the array comprising a merchant correspondence matrix for the predetermined time period, wherein values stored in the array are identifiable by a first dimension i corresponding to an ith merchant of the plurality of merchants and a second dimension j corresponding to a jth merchant of the plurality of merchants, and wherein i and j are integers between one and n;
populate each value (i, j) in the array in the memory device with a respective counter (i, j), wherein each counter (i, j) is obtained by parsing the first transaction data to count, from the plurality of account holders, a number of account holders having at least one historical payment transaction with both the ith merchant and the jth merchant during the predetermined time period, wherein each counter is associated with a merchant pair and is configured to increment when, during the predetermined time period, each respective account holder transacts with both merchant i and merchant j which comprise the merchant pair;
generate an account holder historic transaction vector for each of the plurality of account holders, wherein the account holder historic transaction vector comprises n elements and each element corresponds to one of the plurality of merchants, wherein a respective value of each element is set by parsing the historical payment transactions of the respective account holder to determine whether the account holder visited the corresponding merchant during the predetermined time period;

receive, via the payment processing network from a merchant computing device of a first-time merchant of the plurality of merchants, second transaction data associated with a new requested payment transaction between an account holder of the plurality of account holders and the first-time merchant, wherein the account holder has no historical transactions in the first transaction data with the first-time merchant;

generate an inverse recommender score vector by iteratively applying the merchant correspondence matrix to the account holder historic transaction vector over a selectable number of iterations, wherein the applying comprises using a matrix-vector multiplication function;

determine, for each element of the account holder historic transaction vector, a change between the element value of the account holder historic transaction vector and a value of a corresponding element of the inverse recommender score vector, wherein the change in the value for the element corresponding to the first-time merchant being significantly larger than the change in the values of the elements corresponding to others of the merchants indicates that the new requested payment transaction is out-of-pattern for the account holder; and transmit an alert, via the payment processing network, to the issuer computing device if the new requested payment transaction is out-of-pattern for the account holder, wherein the alert activates a fraud scoring system associated with the payment processing network to (i) flag the new requested payment transaction as high risk for fraud and (ii) generate a fraud score recommending whether to approve or decline the new requested payment transaction.

2. The server in accordance with claim 1, wherein said processor is further configured to iteratively apply the merchant correspondence matrix to the account holder historic transaction vector by:

(i) generating a first iteration of the inverse recommender score vector by applying the merchant correspondence matrix directly to the account holder historic transaction vector, comprising using the matrix-vector multiplication function;

(ii) generating a next iteration of the inverse recommender score vector by applying the merchant correspondence matrix to a previous iteration of the inverse recommender score vector, comprising using the matrix-vector multiplication function; and (iii) repeating step (ii) a number of iterations to obtain a final iteration of the inverse recommender score vector.

3. The server in accordance with claim 2, wherein said processor is further configured to generate the next iteration of the inverse recommender score vector by:

generating a weighted combination vector by applying a vector operation $C=xA+(1-x)B$, wherein A is the previous iteration of the inverse recommender score vector, B is the account holder historic transaction vector, and x is a constant value between zero and one; and applying the merchant correspondence matrix directly to the weighted combination vector using the matrix-vector multiplication function to obtain the next iteration of the inverse recommender score vector.

4. The server in accordance with claim 1, wherein said processor is further configured to parse the first transaction data by arranging, in the memory device, the data structure.

5. The server in accordance with claim 1, wherein said processor is further configured to populate each value (i, j) in the array based on the account holder links to the pairs of merchants in the data structure.

6. The server in accordance with claim 1, said processor is further configured to determine the change between the element value of the account holder historic transaction vector and the value of the corresponding element of the inverse recommender score vector by comparing a proportionate change in the value for each merchant of the plurality of merchants.

7. The server in accordance with claim 1, wherein said processor is further configured to generate the account holder historic transaction vector by:

initializing each element of the account holder historic transaction vector to a non-zero value; and updating the value of each element corresponding to a merchant visited by the account holder during the predetermined time period to a greater value than the non-zero value.

8. A computer-based method for receiving and detecting possibly fraudulent payment transactions, said method executed on a server including a memory device for storing data and a processor communicatively coupled to the memory device and to a payment card processing network, wherein the payment processing network routes electronic communications between a plurality of merchants and a plurality of issuers of payment cards to a plurality of account holders who have accounts with one or more of the plurality of issuers, each merchant being communicatively coupled to said processor via at least one merchant computing device where account holder payment transactions are initiated, and each issuer being communicatively coupled to said processor via an issuer computing device, wherein the server further comprises an inverse recommender module for receiving and detecting the possibly fraudulent payment transactions by detecting out-of-pattern payment transactions by one or more of the plurality of account holders, the method comprising steps, performed by the processor, of:

receiving first transaction data corresponding to historical payment transactions from a predetermined time period between the plurality of account holders and the plurality of merchants, wherein the first transaction data includes, for each of the historical payment transactions, an identifier of an account associated with the respective account holder and an identifier of the respective merchant, and wherein the plurality of merchants numbers n;

linking, in the memory device using the first transaction data, the account of each account holder with pairs of merchants with which the account holder transacted business during the predetermined time period;

initializing an array in the memory device, the array comprising a data structure stored in the memory device and based on the linking, the array comprising a merchant correspondence matrix for the predetermined time period, wherein values stored in the array are identifiable by a first dimension i corresponding to an ith merchant of the plurality of merchants and a second dimension j corresponding to a jth merchant of the plurality of merchants, and wherein i and j are integers between one and n;

populating each value (i, j) in the array in the memory device with a respective counter (i, j), wherein each counter (i, j) is obtained by parsing the first transaction data to count, from the plurality of account holders, a number of account holders having at least one historical payment transaction with both the ith merchant and the jth merchant during the predetermined time period, wherein each counter is associated with a merchant pair and is configured to increment when, during the predetermined time period, each respective account holder transacts with both merchant i and merchant j which comprise the merchant pair;

generating an account holder historic transaction vector for each of the plurality of account holders, wherein the account holder historic transaction vector comprises n elements and each element corresponds to one of the plurality of merchants, wherein a respective value of each element is set by parsing the historical payment transactions of the respective account holder to determine whether the account holder visited the corresponding merchant during the predetermined time period;

receiving, via the payment processing network from a merchant computing device of a first-time merchant of the plurality of merchants, second transaction data associated with a new requested payment transaction between an account holder of the plurality of account holders and the first-time merchant, wherein the account holder has no historical transactions in the first transaction data with the first-time merchant;

generating an inverse recommender score vector by iteratively applying the merchant correspondence matrix to the account holder historic transaction vector over a selectable number of iterations, wherein the applying comprises using a matrix-vector multiplication function;

determining, for each element of the account holder historic transaction vector, a change between the element value of the account holder historic transaction vector and a value of a corresponding element of the inverse recommender score vector, wherein the change in the value for the element corresponding to the first-time merchant being significantly larger than the change in the values of the elements corresponding to others of the merchants indicates that the new requested payment transaction is out-of-pattern for the account holder; and transmitting an alert, via the payment processing network, to the issuer computing device if the new requested payment transaction is out-of-pattern for the account holder, wherein the alert activates a fraud scoring system associated with the payment processing network to (i) flag the new requested payment transaction as high risk for fraud and (ii) generate a fraud score recommending whether to approve or decline the new requested payment transaction.

9. The method in accordance with claim 8, wherein iteratively applying the merchant correspondence matrix to the account holder historic transaction comprises:

(i) generating a first iteration of the inverse recommender score vector by applying the merchant correspondence matrix directly to the account holder historic transaction vector, comprising using the matrix-vector multiplication function;

(ii) generating a next iteration of the inverse recommender score vector by applying the merchant correspondence matrix to a previous iteration of the inverse recommender score vector, comprising using the matrix-vector multiplication function; and (iii) repeating step (ii) a number of iterations to obtain a final iteration of the inverse recommender score vector.

10. The method in accordance with claim 9, wherein generating the next iteration of the inverse recommender score vector comprises:

generating a weighted combination vector by applying a vector operation $C=xA+(1-x)B$, wherein A is the previous iteration of the inverse recommender score vector, B is the account holder historic transaction vector, and x is a constant value between zero and one; and applying the merchant correspondence matrix directly to the weighted combination vector using the matrix-vector multiplication function to obtain the next iteration of the inverse recommender score vector.

11. The method in accordance with claim 8, wherein parsing the first transaction data comprises arranging, in the memory device, the data structure.

12. The method in accordance with claim 8, wherein populating each value (i, j) in the array is based on the account holder links to the pairs of merchants in the data structure.

13. The method in accordance with claim 8, wherein determining the change between the element value of the account holder historic transaction vector and the value of the corresponding element of the inverse recommender score vector comprises comparing a proportionate change in the value for each merchant of the plurality of merchants.

14. The method in accordance with claim 8, wherein generating the account holder historic transaction vector comprises:

initializing each element of the account holder historic transaction vector to a non-zero value; and updating the value of each element corresponding to a merchant visited by the account holder during the predetermined time period to a greater value than the non-zero value.

15. One or more non-transitory computer-readable storage media having computer-executable instructions embodied thereon for receiving and detecting possibly fraudulent payment transactions using a server including a memory device for storing data and at least one processor communicatively coupled to the memory device and to a payment card processing network, wherein the payment processing network routes electronic communications between a plurality of merchants and a plurality of issuers of payment cards to a plurality of account holders who have accounts with one or more of the plurality of issuers, each merchant being communicatively coupled to said processor via at least one merchant computing device where account holder payment transactions are initiated, and each issuer being communicatively coupled to said processor via an issuer computing device, wherein the server further comprises an inverse recommender module for receiving and detecting the possibly fraudulent payment transactions by detecting out-of-pattern payment transactions by one or more of the plurality of account holders, and wherein when the computer-executable instructions are executed by the at least one processor, the computer-executable instructions cause the at least one processor to:

receive first transaction data corresponding to historical payment transactions from a predetermined time period between the plurality of account holders and the plurality of merchants, wherein the first transaction data includes, for each of the historical payment transactions, an identifier of an account associated with the respective account holder and an identifier of the respective merchant;

link, in the memory device using the first transaction data, the account of each account holder with pairs of merchants with which the account holder transacted business during the predetermined time period;

initialize an array in the memory device, the array comprising a data structure stored in the memory device and based on the linking, the array comprising a merchant correspondence matrix for the predetermined time period, wherein values stored in the array are identifiable by a first dimension i corresponding to an ith merchant of the plurality of merchants and a second dimension j corresponding to a jth merchant of the plurality of merchants, wherein i and j are integers between one and n, and wherein the plurality of merchants numbers n;

populate each value (i, j) in the array in the memory device with a respective counter (i, j), wherein each counter (i, j) is obtained by parsing the first transaction data to count, from the plurality of account holders, a number of account holders having at least one historical payment transaction with both the ith merchant and the jth merchant during the predetermined time period, wherein each counter is associated with a merchant pair and is configured to increment when, during the predetermined time period, each respective account holder transacts with both merchant i and merchant j which comprise the merchant pair;

generate an account holder historic transaction vector for each of the plurality of account holders, wherein the account holder historic transaction vector comprises n elements and each element corresponds to one of the plurality of merchants, wherein a respective value of each element is set by parsing the historical payment transactions of the respective account holder to determine whether the account holder visited the corresponding merchant during the predetermined time period;

receive, via the payment processing network from a merchant computing device of a first-time merchant of the plurality of merchants, second transaction data associated with a new requested payment transaction between an account holder of the plurality of account holders and the first-time merchant, wherein the account holder has no historical transactions in the first transaction data with the first-time merchant;

generate an inverse recommender score vector by iteratively applying the merchant correspondence matrix to the account holder historic transaction vector over a selectable number of iterations, wherein the applying comprises using a matrix-vector multiplication function;

determine, for each element of the account holder historic transaction vector, a change between the element value of the account holder historic transaction vector and a value of a corresponding element of the inverse recommender score vector, wherein the change in the value for the element corresponding to the first-time merchant being significantly larger than the change in the values of the elements corresponding to others of the merchants indicates that the new requested payment transaction is out-of-pattern for the account holder; and transmitting an alert, via the payment processing network, to the issuer computing device if the new requested payment transaction is out-of-pattern for the account holder, wherein the alert activates a fraud scoring system associated with the payment processing network to (i) flag the new requested payment transaction as high risk for fraud and (ii) generate a fraud score recommending whether to approve or decline the new requested payment transaction.

16. The one or more non-transitory computer-readable storage media in accordance with claim 15, wherein the computer-executable instructions further cause the at least one processor to iteratively apply the merchant correspondence matrix to the account holder historic transaction vector by:
(i) generating a first iteration of the inverse recommender score vector by applying the merchant correspondence matrix directly to the account holder historic transaction vector, comprising using the matrix-vector multiplication function;
(ii) generating a next iteration of the inverse recommender score vector by applying the merchant correspondence matrix to a previous iteration of the inverse recommender score vector, comprising using the matrix-vector multiplication function; and
(iii) repeating step (ii) a number of iterations to obtain a final iteration of the inverse recommender score vector.

17. The one or more non-transitory computer-readable storage media in accordance with claim 16, wherein the computer-executable instructions further cause the at least one processor to generate the next iteration of the inverse recommender score vector by:
generating a weighted combination vector by applying a vector operation $C=xA+(1-x)B$, wherein A is the previous iteration of the inverse recommender score vector, B is the account holder historic transaction vector, and x is a constant value between zero and one; and
applying the merchant correspondence matrix directly to the weighted combination vector using the matrix-vector multiplication function to obtain the next iteration of the inverse recommender score vector.

18. The one or more non-transitory computer-readable storage media in accordance with claim 15, wherein the computer-executable instructions further cause the at least one processor to parse the first transaction data by arranging, in the memory device, the data structure.

19. The one or more non-transitory computer-readable storage media in accordance with claim 15, wherein the computer-executable instructions further cause the at least one processor to populate each value (i, j) in the array based on the account holder links to the pairs of merchants in the data structure.

20. The one or more non-transitory computer-readable storage media in accordance with claim 15, wherein the computer-executable instructions further cause the at least one processor to determine the change between the element value of the account holder historic transaction vector and the value of the corresponding element of the inverse recommender score vector by comparing a proportionate change in the value for each merchant of the plurality of merchants.

* * * * *